(12) United States Patent
Sakai

(10) Patent No.: US 7,681,041 B2
(45) Date of Patent: Mar. 16, 2010

(54) IMAGE FORMATION APPARATUS, DATA RECEPTION METHOD, PROGRAM FOR PERFORMING DATA RECEPTION METHOD, AND STORAGE MEDIUM FOR STORING PROGRAM

(75) Inventor: Masahiko Sakai, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 1530 days.

(21) Appl. No.: 10/980,289

(22) Filed: Nov. 4, 2004

(65) Prior Publication Data

US 2005/0108547 A1     May 19, 2005

(30) Foreign Application Priority Data

Nov. 14, 2003   (JP) .............................. 2003-385059

(51) Int. Cl.
    *G06F 21/00*    (2006.01)
(52) U.S. Cl. ....................................... 713/182; 380/243
(58) Field of Classification Search ................. 380/243; 713/182
    See application file for complete search history.

(56) References Cited

U.S. PATENT DOCUMENTS

| | | | |
|---|---|---|---|
| 5,937,069 A * | 8/1999 | Nagai et al. ................. 713/162 |
| 6,353,482 B1 | 3/2002 | Abe et al. ................... 358/1.15 |
| 7,173,721 B1 * | 2/2007 | Kobayashi et al. ......... 358/1.15 |
| 2001/0056538 A1 * | 12/2001 | Amano ....................... 713/185 |
| 2003/0002066 A1 * | 1/2003 | Miyano ..................... 358/1.14 |
| 2003/0067621 A1 * | 4/2003 | Tanaka ...................... 358/1.13 |
| 2004/0250129 A1 * | 12/2004 | Clough et al. ............... 713/201 |
| 2005/0132094 A1 * | 6/2005 | Wu ............................... 710/8 |

FOREIGN PATENT DOCUMENTS

JP          2003-114789          4/2003

* cited by examiner

*Primary Examiner*—Matthew B Smithers
(74) *Attorney, Agent, or Firm*—Fitzpatrick, Cella, Harper & Scinto

(57) ABSTRACT

In an image formation apparatus which receives data transmitted from plural external apparatuses connected through a network and processes the received data, transmission source lists associated with users of the image formation apparatus are stored in a memory, the transmission source list corresponding to the user authenticated with respect to the image formation apparatus is selected, it is judged, when the data is received from the external apparatus, whether or not transmission source information of the external apparatus has been registered on the transmission source list, and it is controlled based on the judged result whether or not to process the received data.

10 Claims, 16 Drawing Sheets

FIG. 23

STORAGE MEDIUM SUCH AS
FD, CD-ROM, OR THE LIKE

| DIRECTOTY INFORMATION |
|---|
| 1ST DATA PROC PROGRAM<br>PROGRAM CODE GROUP CORRESPONDING TO STEPS IN FLOW CHART OF FIG. 4 |
| 2ND DATA PROC PROGRAM<br>PROGRAM CODE GROUP CORRESPONDING TO STEPS IN FLOW CHART OF FIG. 9 |
| 3RD DATA PROC PROGRAM<br>PROGRAM CODE GROUP CORRESPONDING TO STEPS IN FLOW CHART OF FIG. 16 |
| 4TH DATA PROC PROGRAM<br>PROGRAM CODE GROUP CORRESPONDING TO STEPS IN FLOW CHART OF FIG. 17 |
| 5TH DATA PROC PROGRAM<br>PROGRAM CODE GROUP CORRESPONDING TO STEPS IN FLOW CHART OF FIG. 22 |

MEMORY MAP OF STORAGE MEDIUM

IMAGE FORMATION APPARATUS, DATA RECEPTION METHOD, PROGRAM FOR PERFORMING DATA RECEPTION METHOD, AND STORAGE MEDIUM FOR STORING PROGRAM

BACKGROUND OF THE INVENTION

1. Field of the Invention

The present invention relates to an image formation apparatus which receives data transmitted from plural external apparatuses connected to the image formation apparatus through a network and then processes the received data, a data reception processing method which is adapted to perform the data reception and the received-data process, a storage medium which stores a computer-readable program for performing the data reception processing method, and the program itself.

2. Related Background Art

In recent years, according to development of network technology, a mode that a single printer connected to a single personal computer is used is changing to a mode that a single printer directly connected to a network is shared by plural users. Moreover, because the network is connected to the Internet nowadays, an Internet-ready printer which receives data through the Internet and then prints the received data is developed. In this kind of Internet-ready printer, a user authentication means which authenticates a user through a user name and a user password is provided within the printer so as to prevent unauthorized or unfair printing, whereby only previously permitted (authenticated) users (or host computers) can perform print processes by using this printer.

Moreover, in such an environment, to know and administrate which user (or host computer) uses the printer to what extent, a print administration system that a print server for administrating the use of the printer is installed and provided on the network and thus the user has to transmit a print job through the print server without exception is widely used.

In this kind of print administration system, the print server has a user authentication function to authenticate the user, a spool function to store the print job, a scheduling function to control the order of printing based on print jobs, and the like. Thus, it is possible to centralize various printer use conditions.

On one hand, in the Internet-ready printer which can perform the printing through the Internet because the network to which the printer belongs is connected to the Internet, everyone who can access the Internet can directly transmit the data to the Internet-ready printer through the Internet and thus cause the printer to output documents.

Here, it should be noted that the host computer denotes the computer which has a network address such as an IP address or the like.

In the above network-ready printer, there is a fear that a vicious user needlessly performs a great deal of printing through the network, whereby there is a problem that out of paper occurs due to the needless printing and thus the printer cannot be used any more.

For example, Japanese Patent Application Laid-Open No. 2003-114789 discloses two methods to be used in an image formation apparatus which receives data transmitted from plural transmission sources through a network and processes the received data. More specifically, in one method, information representing a user or a host computer of a data transmission source is obtained from the received data, it is judged whether or not the user or the host computer represented by the obtained information is included in the users or the host computers previously registered and stored in the memory of the image formation apparatus, and it is determined whether or not to perform a necessary process based on the received data in accordance with the judged result. Moreover, in the other method, it enables to register the user or the host computer permitted to perform the necessary process onto a permitted-host list, it enables to register the user or the host computer inhibited (or rejected) to perform the necessary process onto an inhibited-host (or rejected-host) list, it is judged whether or not the user or the host computer represented by the information obtained from the received data is included in the permitted-host list, it is further judged whether or not the user or the host computer represented by the information obtained from the received data is included in the inhibited-host list, and the necessary process based on the received data is performed in accordance with the results of the. permitted-host list judgment and the inhibited-host list judgment.

However, in the background related art as described above, the number of the users or the host computers capable of being registered in the inhibited-host list and/or the permitted-host list of the image formation apparatus is limited.

For this reason, for example, there is a problem that the user of the host computer in which the relevant user of host computer could not be additionally registered in the permitted-host list cannot use the image formation apparatus if the user does not reset or invalidate the permitted-host list.

Further, because the image formation apparatus merely includes one set of the inhibited-host list and the permitted-host list, for example, there is a problem that, if it intends to limit usable computers with respect to each individual or group, it is necessary to reset the permitted-host list with respect to each individual or group.

Furthermore, in the background related art as described above, setting can be changed any time. Thus, for example, there is a problem that, even while the user of the host computer to which access is permitted is performing communication, such communication is interrupted if the access is limited by changing the setting.

SUMMARY OF THE INVENTION

An object of the present invention is to provide an image formation apparatus which solves the above problems.

Another object of the present invention is to provide an image formation apparatus which stores in a memory at least one transmission source list associated with users of the image formation apparatus, and selects the transmission source list corresponding to the user discriminated by user authentication, thereby enabling to set, with respect to each individual, the transmission source list for permitting or inhibiting (or rejecting) a process to data received by the image formation apparatus.

Still another object of the present invention is to register, in a transmission source list, transmission source information for inhibiting a process of data received by an image formation apparatus.

Still another object of the present invention is to register, in a transmission source list, transmission source information for permitting a process of data received by an image formation apparatus.

Still another object of the present invention is to register, in a transmission source list, transmission source information for inhibiting a process of data received by an image formation apparatus and transmission source information for permitting the process of the data received by the image formation apparatus.

Still another object of the present invention is to select, in a case where user authentication is performed during data reception from an external apparatus, a transmission source list corresponding to the user discriminated by the user authentication after the current data reception ends.

Still another object of the present invention is to register transmission source information on a transmission source list, based on history information of an image formation apparatus.

BRIEF DESCRIPTION OF THE DRAWINGS

FIG. 23 is a diagram for explaining a memory map of a storage medium which stores various data processing programs readable by an image processing apparatus according to the present invention.

DETAILED DESCRIPTION OF THE PREFERRED EMBODIMENTS

Then, the preferable embodiment of the present invention will be explained with reference to the accompanying drawings.

Hereinafter, an image formation apparatus according to the embodiment of the present invention will be explained.

In the following explanation, it should be noted that the subject that performs execution and judgment is a CPU as hardware and image formation control software as software.

Figure 1:
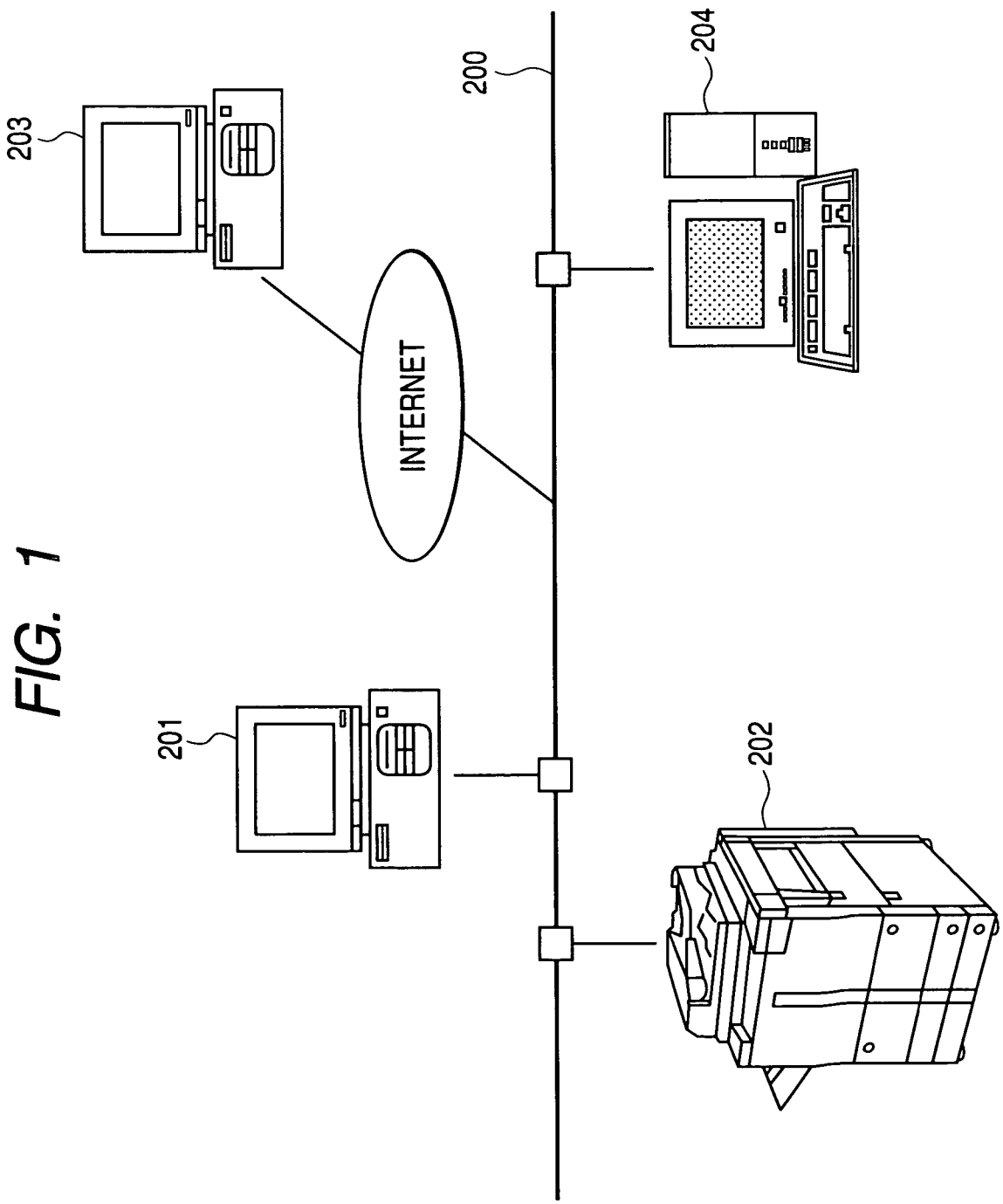
FIG. 1 is a diagram showing an example of a network print system to which an image formation apparatus according to one embodiment of the present invention is applicable.

FIG. 1 is a diagram showing an example of a network print system to which the image formation apparatus according to the embodiment of the present invention is applicable.

In the embodiment, as shown in FIG. 1, a computer 201 transmits a print job to an image formation apparatus 202 through a network 200, and the image formation apparatus 202 rasterizes the received print job and then performs print output.

Incidentally, the plural computers 201, 204 and the like are connected to the network 200, whereby each of the connected computers can transmit, as well as the computer 201, a print job to the image formation apparatus 202 for the print output through the network 200. Besides, the network 200 is connected to the Internet, whereby a computer 203 on another network can transmit a print job to the image formation apparatus 202 through the Internet.

Incidentally, the image formation apparatus 202 has an E-mail transmission function using an SMTP (Simple Mail Transfer Protocol) so as to be able to transmit an E-mail to the computer on the network 200, the computer on the Internet, and the computer on another network through the Internet.

Subsequently, the detailed structure of the image formation apparatus 202 will be explained with reference to FIG. 2.

Figure 2:
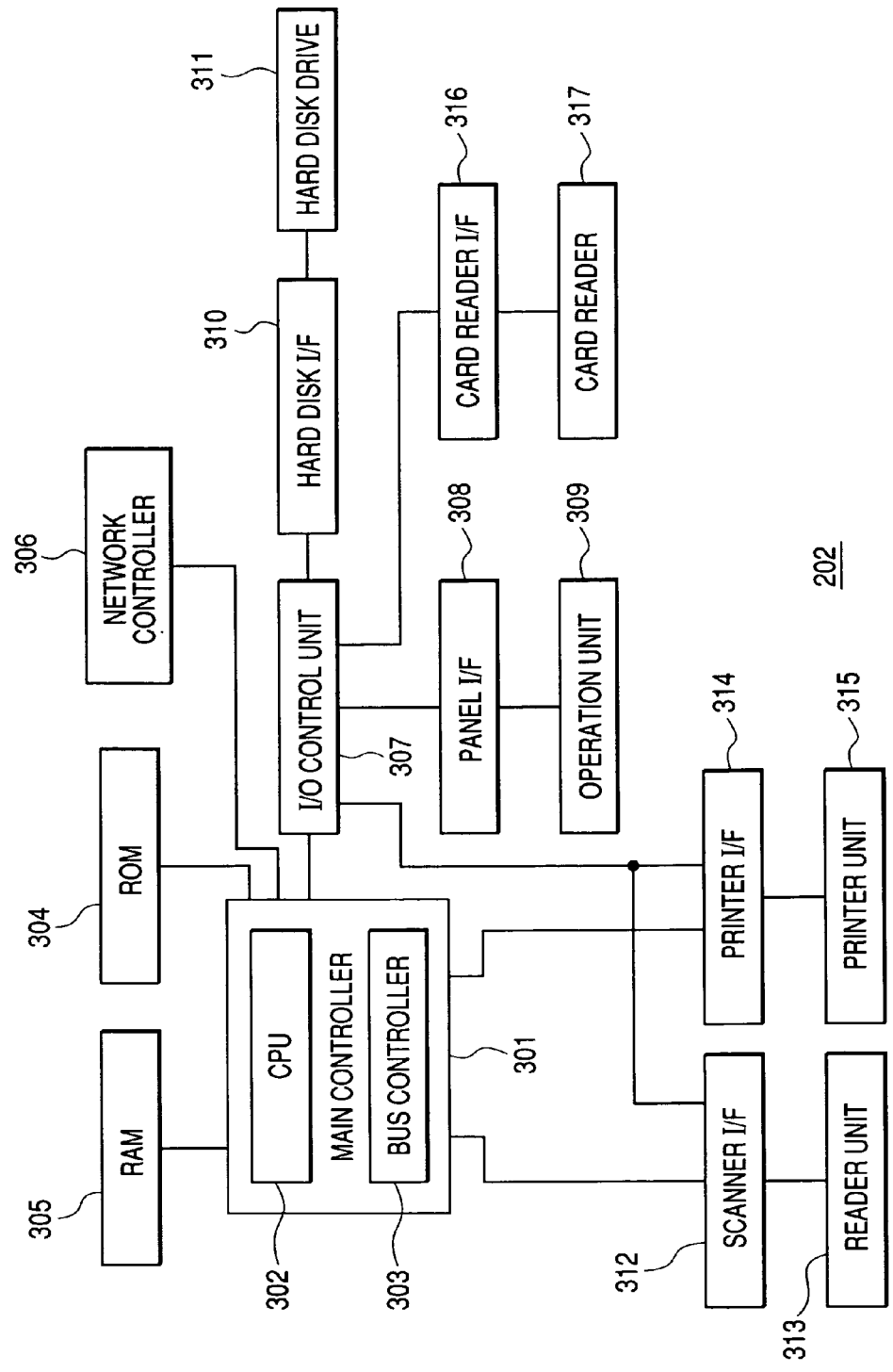
FIG. 2 is a block diagram showing the structure of the image formation apparatus shown in FIG. 1.

FIG. 2 is the block diagram showing the structure of the image formation apparatus 202 according to the embodiment shown in FIG. 1.

In FIG. 2, the image formation apparatus 202 includes a main controller 301 which controls the entirety of this apparatus. The main controller 301 includes a CPU 302, a bus controller 303, various I/F (interface) controller circuits (not shown) and the like, and a ROM 304 and a RAM 305 are connected to the main controller 301. The CPU 302 performs various processes according to programs read from the ROM 304. For example, the CPU 302 performs an extraction process of analyzing a PDL (page-description language) received from the computer 201 and extracting it into raster image data. The RAM 305 acts as the working area for the CPU 302 and also stores various image data. Besides, a network controller 306 which is connected to the main controller 301 has a network function based on an Ethernet™ and the like. The network controller 306 is also connected to the network 200 (FIG. 1).

Further, an I/O (input and output) control unit 307 is connected to main controller 301. Besides, the I/O control unit 307 is connected to a scanner I/F 312 and a printer I/F 314 so as to exchange control commands with the CPU's of a reader unit 313 and a printer unit 315 respectively.

In addition, the I/O control unit 307 is connected to a panel I/F 308 which acts as the interface with an operation unit 309. The operation unit 309 which includes an LCD, LED's, various switches, and the like is used by an operator (user) to, for example, input various settings and display various errors.

A hard disk (HD) I/F 310 is the interface for connecting an external storage device. Thus, when the external storage device such as a hard disk or the like is connected to the hard disk I/F 310, image data can be written into and read from the external storage device. In the embodiment, a hard disk drive (HDD) 311 is connected to the hard disk I/F 310.

The main controller 301 connected to the reader unit 313 through the scanner I/F 312. Here, the scanner I/F 312 has a process function to optimally perform a binarization process, a magnification change process and the like to image data received from the reader unit 313, and a video control function to generate a control signal based on a video control signal received from the reader unit 313 and output the generated control signal to the main controller 301.

Likewise, the main controller 301 is connected to the printer unit 315 through the printer I/F 314. Here, the printer I/F 314 has a smoothing function to perform a smoothing process to the image data received from the main controller 301 and output the processed data to the printer unit 315, and a video control function to generate a control signal based on a video control signal received from the printer unit 315 and output the generated control signal to the main controller 301. Besides, it is controlled by the bus controller 303 to transfer the raster image data extracted on the RAM 305 to the printer unit 315.

A card reader I/F 316 which is the interface of a card reader 317 acting as a reading device of a magnetic card, an IC card and the like is connected to the card reader 317 and the I/O control unit 307.

Figure 3:
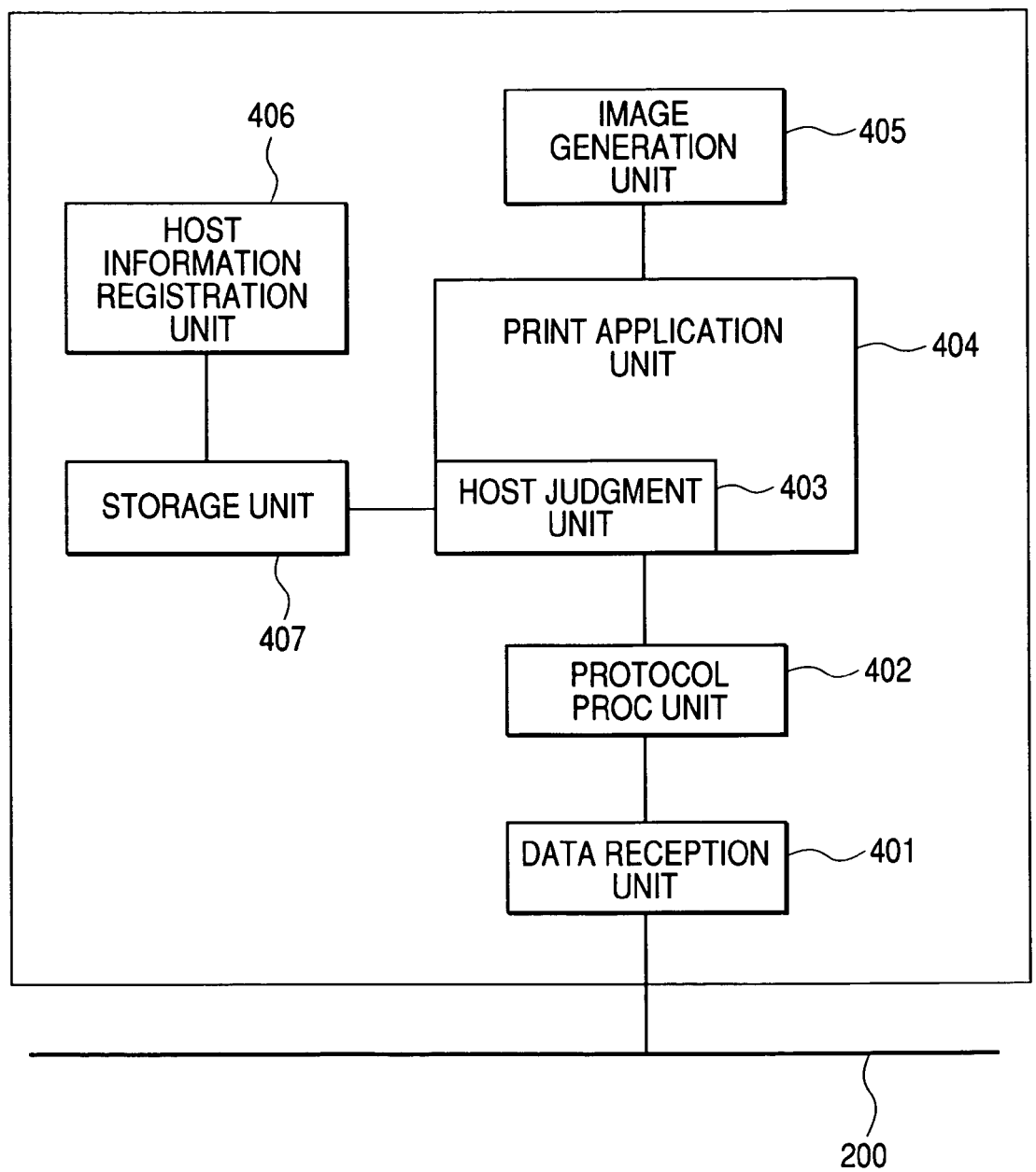
FIG. 3 is a block diagram showing the functional structure of the image formation apparatus shown in FIG. 1.

FIG. 3 is a block diagram showing the functional structure of the image formation apparatus 202 shown in FIG. 1.

In FIG. 3, a data reception unit 401 receives the data from the network 200, analyzes the received data, and then transfers the received data to a protocol processing unit 402 when the transmission destination address of the received data is the address of the image formation apparatus 202 or a broadcast address.

Meanwhile, when the transmission destination address of the received data is the address other than the address of the image formation apparatus 202 and the broadcast address, the data reception unit 401 erases the received data. The protocol processing unit 402 communicates with the computer 201 and the like by using a network protocol such as a TCP/IP (Transmission Control Protocol/Internet Protocol), and transfers the received data to a print application unit 404.

In the embodiment, the print application unit 404 communicates with the computer 201 and the like by using an application protocol such as an LPD (Line Printer Daemon) defined by the RFC (Requests For Comments) 1179, and transfers the received data to an image generation unit 405. Here, it should be noted that the RFC 1179 is the published document on which techniques and proposals concerning the Internet are described, and the LPD is one of services of a print server and used to receive a document (print job) from an LPR (Line Printer Remote) tool operating in a client system.

The image generation unit 405 rasterizes the data received from the print application unit 404, and generates image data based on the received data. Thus, an image represented by the image data is printed on a paper, and the paper is then discharged. Incidentally, the print application unit 404 includes a host judgment unit 403 to be able to compare host information included in the data received from the protocol processing unit 402 with host information registered by a host information registration unit 406 and stored in a storage unit 407.

Here, the host information stored in the storage unit 407 is constituted by a host list on which the IP addresses or the host names of the hosts of which accesses to the image formation apparatus 202 are permitted/inhibited (or permitted/rejected). Moreover, the host list includes a default host list of the image formation apparatus 202 not dependent on the user thereof and plural host lists each of which is independently registered with respect to each user of the image formation apparatus 202.

Subsequently, a process to be performed when the data is received by the print application unit 404 will be explained with reference to FIG. 4.

Figure 4:
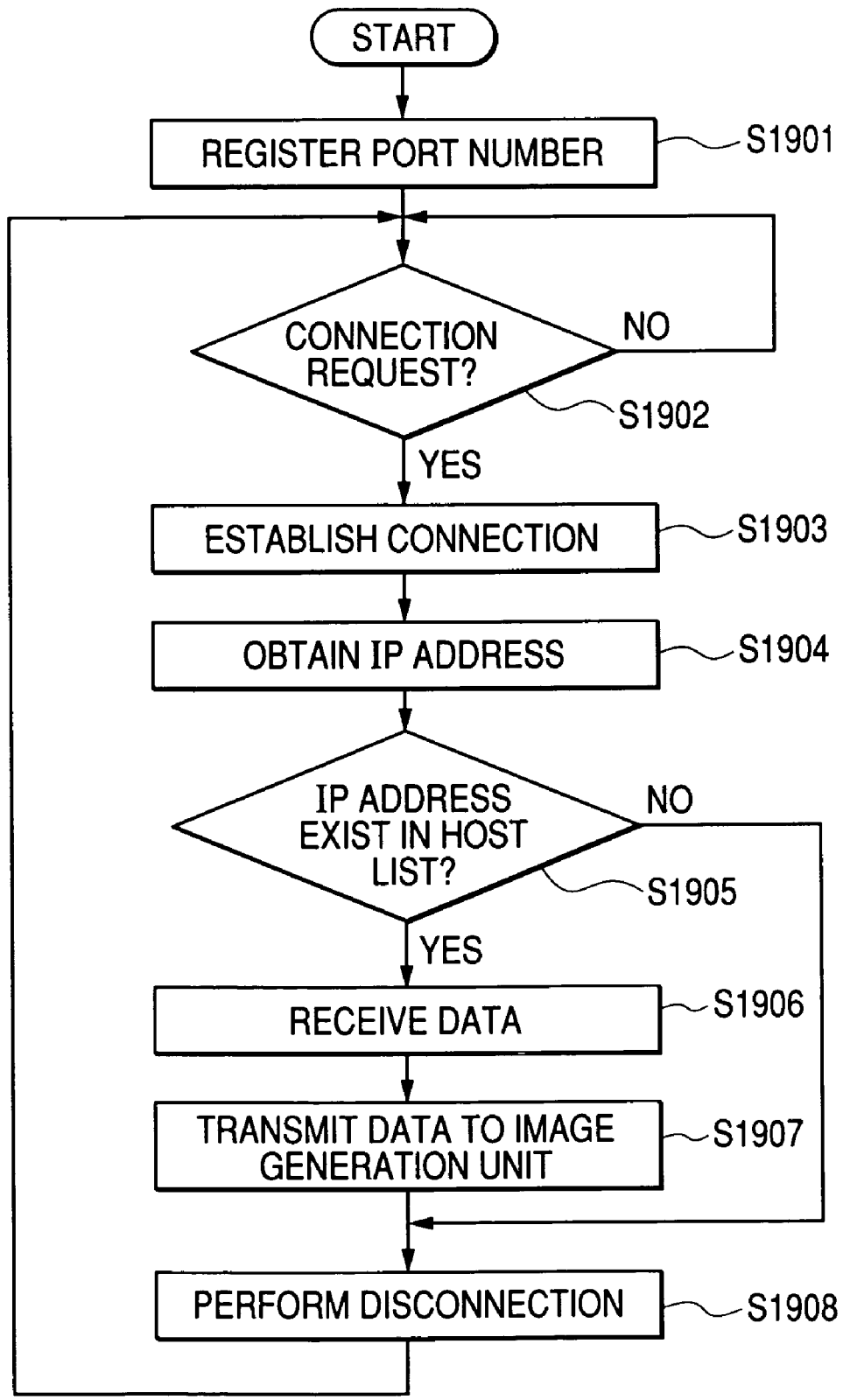
FIG. 4 is a flow chart showing an example of a first data processing procedure to be performed in the image formation apparatus according to the present invention.

FIG. 4 is the flow chart showing an example of a first data processing procedure to be performed in the image formation apparatus 202 according to the embodiment. Here, it should be noted that the first data processing procedure corresponds to the processing procedure to be performed when the data is received by the print application unit 404 shown in FIG. 3, and symbols S1901 to S1908 in FIG. 4 denote procedure steps respectively.

First, in the initial stage, the print application unit 404 registers, to the protocol processing unit 402, a port number through which the data is received (S1901), and waits until a connection request is received from the network (S1902). When the connection request is received, the protocol processing unit 402 establishes the connection with the host computer from which the connection request was transmitted (S1903), and obtains the IP address of the host computer in question (S1904).

Subsequently, the host judgment unit 403 judges by a later-described method whether or not the IP address obtained in the step S1904 exists in the host computer IP address list (host list) stored in the storage unit 407 (S1905). Then, when judged that the obtained IP address exists in the host list, the host judgment unit 403 receives print data from the host computer (S1906), and transmits the received print data to the image generation unit 405 (S1907).

When all the print data are received, the host computer is then disconnected (S1908), and the print application unit 404 waits until a next connection request is received (S1902).

Meanwhile, when judged in the step S1905 that the obtained IP address does not exist in the host list, the establish connection is disconnected (S1908), and the print application unit 404 waits until the next connection request is received (S1902).

Figure 5:
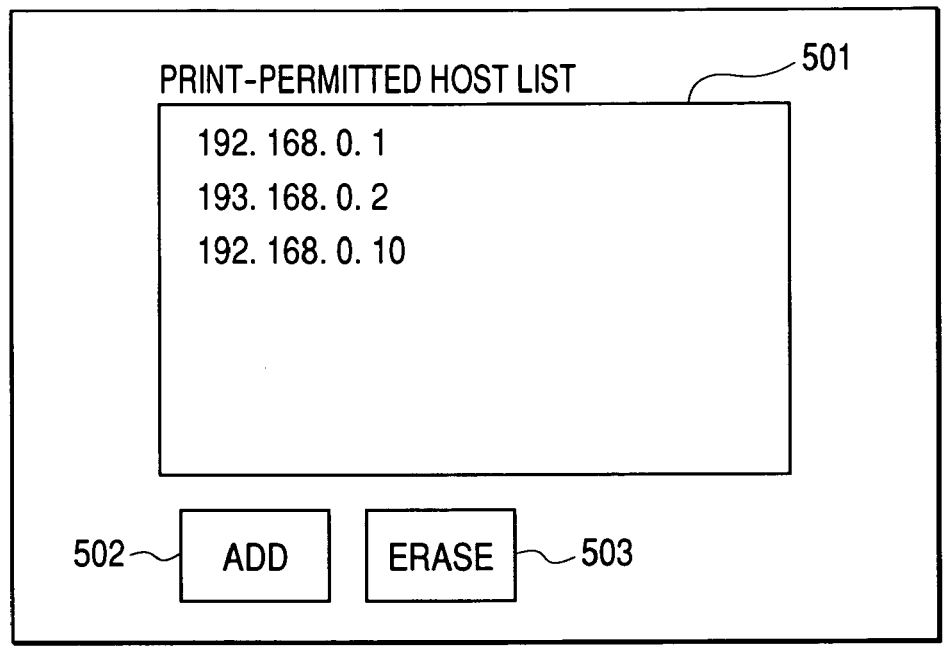
FIG. 5 is a diagram showing an example of an operation screen associated with registration of a print-permitted host displayed on the operation unit shown in FIG. 2.

FIG. 5 is a diagram showing an example of an operation screen associated with registration of a print-permitted host displayed on the operation unit 309 shown in FIG. 2. It should be noted that the operation screen shown in FIG. 5 corresponds to an example of a screen to be displayed, to register the host computer that the printing is permitted, on the host information registration unit 406 shown in FIG. 3. Here, the operation screen shown in FIG. 5 is also called the host information registration screen, and the host computer that the printing is permitted is also called the print-permitted host.

As shown in FIG. 5, in the embodiment, the host information registration unit 406 is constituted by an operation panel of the image formation apparatus 202, whereby the user inputs necessary host information through a touch panel.

Of course, it is possible to cause each of the computers 201, 203 and 204 on the network to transmit the input host information to the image formation apparatus 202 and then write the transmitted information in the storage unit 407 through the network, by appropriately executing the program corresponding to the host information registration unit.

The host information registration screen shown in FIG. 5 includes an area 501 for displaying the IP addresses of the host computers that the printing is currently permitted, a button 502 for adding a host computer, and a button 503 for erasing the registered computer. Then, when the button 502 is depressed by the user, the host information registration screen shown in FIG. 5 is changed to a host (information) addition screen shown in FIG. 6.

Figure 6:
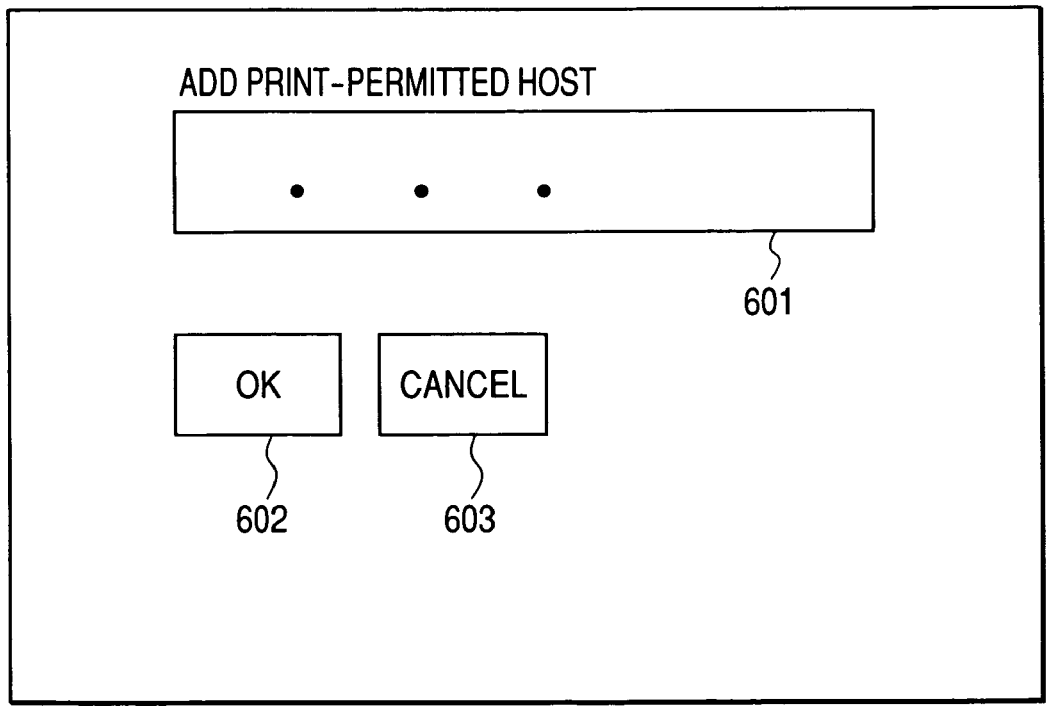
FIG. 6 is a diagram showing an example of a host addition screen displayed on the operation unit shown in FIG. 2.

FIG. 6 is the diagram showing an example of the host addition screen displayed on the operation unit 309 shown in FIG. 2. It should be noted that the host addition screen shown in FIG. 6 corresponds to the case where the IP address of the host computer is input.

In FIG. 6, the host information addition screen includes an area 601 to which the IP address of the host computer is input, a button 602 for deciding the input IP address, and a button 603 for canceling the input.

On the host information addition screen shown in FIG. 6, the user inputs the IP address of the print-permitted host computer by using hard keys such as numeric keys or the like (not shown), and then decides the input IP address by depressing the button 602. Thus, the host information addition screen shown in FIG. 6 is returned to the host information registration screen shown in FIG. 5, and the newly input IP address is additionally displayed in the area 501.

In the above example, the IP address is registered as the host information. However, it is also possible to input the host name of the host computer, obtain the IP address from the input host name, and then register the obtained IP address on the host list.

Next, the case where the name of the print-permitted host computer is input in the host information registration unit 406 will be explained with reference to FIG. 7.

Figure 7:
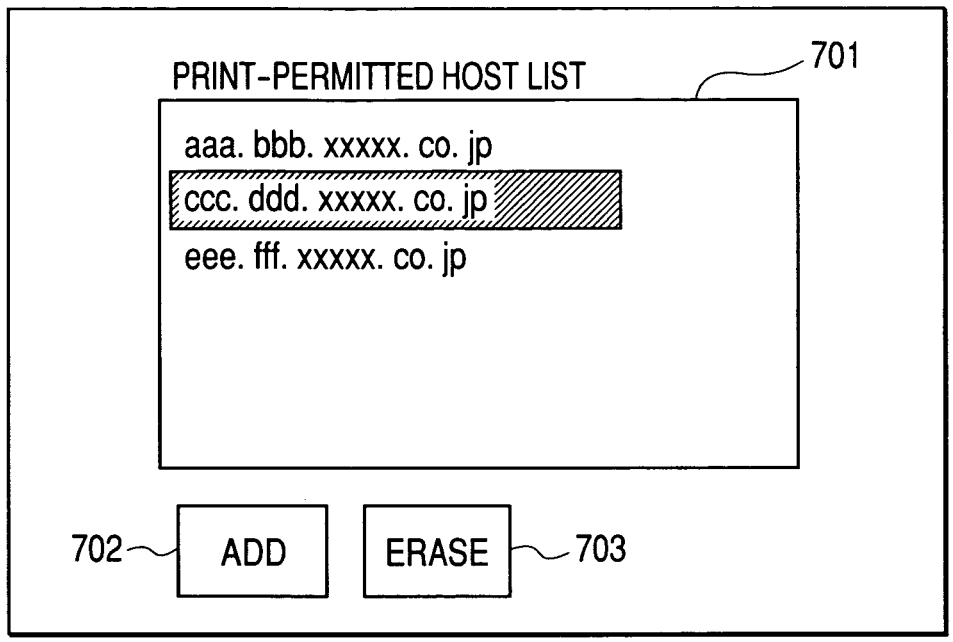
FIG. 7 is a diagram showing an example of a host computer name registration screen displayed on the operation unit shown in FIG. 2.

FIG. 7 is the diagram showing an example of a host computer name registration screen displayed on the operation unit 309 shown in FIG. 2. It should be noted that the host computer name registration screen shown in FIG. 7 corresponds to an example of a screen to be displayed, to register the host computer that the printing is permitted (print-permitted host computer), on the host information registration unit 406 shown in FIG. 3.

In FIG. 7, the host computer name registration screen includes an area 701 for displaying the list of the host names of the currently print-permitted host computers, a button 702 for adding a host computer, and a button 703 for erasing the registered computer. More specifically, the host names of the host computers currently set are displayed in the area 701. In this area, the IP addresses of the host computers represented by the black characters can be obtained and their settings are currently valid, and the IP address of the host computer represented by hatching (or shading) cannot be obtained from the input host name and its setting is currently invalid.

Figure 8:
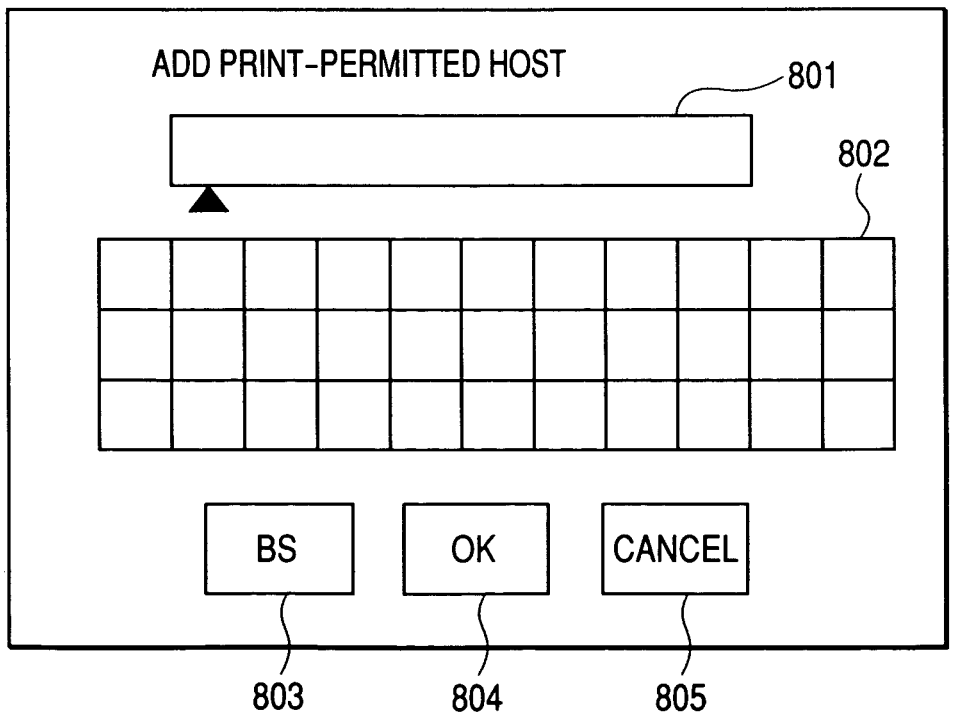
FIG. 8 is a diagram showing an example of a host computer name input screen displayed on the operation unit shown in FIG. 2.

When the button 702 is depressed by the user, the host computer name registration screen shown in FIG. 7 is changed to a host information addition screen shown in FIG. 8.

FIG. 8 is a diagram showing an example of a host computer name input screen displayed on the operation unit 309 shown in FIG. 2. Here, it should be noted that the host computer name input screen is displayed when the button 702 shown in FIG. 7 is depressed.

Such a host information addition screen (i.e., host computer name input screen) shown in FIG. 8 includes an area 801 in which a host name of the host computer is input, a software key 802, a button 803 for erasing one character in the input host name, a button 804 for deciding the input host name, and a button 805 for canceling the input.

On the host computer name input screen, the user inputs the host name of the print-permitted host computer by using the software key 802 on the touch panel, and then tries to obtain the IP address from the newly input host name by using a DNS (Domain Name System) server. When the IP address of the host computer can be obtained from the DNS server, the hatching (or shading) in the area 701 shown in FIG. 7 is changed to the black characters, and the setting is valid. At that time, the obtained IP address is registered on the host list.

Meanwhile, when the IP address of the host computer cannot be obtained, the hatching (or shading) in the area 701 shown in FIG. 7 is maintained. By doing so, the IP address of the host computer can be registered on the host list by using the host name that the user usually sees.

Incidentally, the example that the IP address of the print-permitted host computer is registered on the host list is explained in the above embodiment. However, it is of course possible to register, on the host list, the IP address of the host computer that the printing is not permitted (i.e., inhibited or rejected) so that the print request issued by the registered host computer is not permitted (i.e., inhibited or rejected).

Therefore, by registering the IP address of the print-permitted host computer and performing the print process to only the job transmitted from the registered IP address, for example, it is possible to perform the print process to only a print job transmitted through a registered print server, whereby the printing can be correctly administrated in the image formation apparatus.

Subsequently, a process to be performed when the data is received by the print application unit 404 will be explained with reference to FIG. 9.

Figure 9:
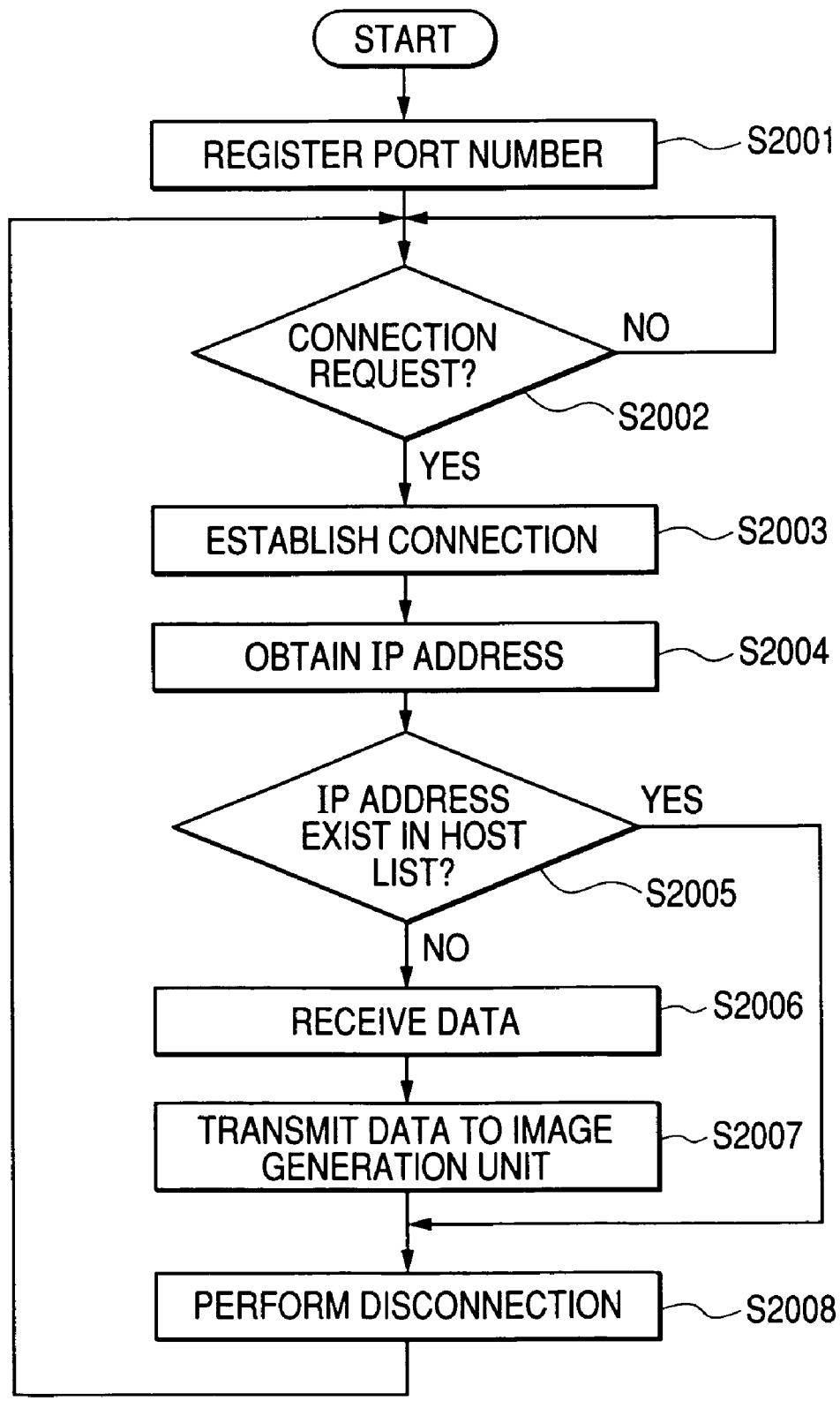
FIG. 9 is a flow chart showing an example of a second data processing procedure to be performed in the image formation apparatus according to the present invention.

FIG. 9 is the flow chart showing an example of a second data processing procedure to be performed in the image formation apparatus according to the embodiment. Here, it should be noted that the second data processing procedure corresponds to the processing procedure to be performed when the data is received by the print application unit 404 (that is, the processing procedure to refuse the data reception from the registered host), and symbols S2001 to S2008 in FIG. 9 denote procedure steps respectively.

First, in the initial stage, the print application unit 404 registers, to the protocol processing unit 402, a port number through which the data is received (S2001), and waits until a connection request is received from the network (S2002). When the connection request is received from the network, the protocol processing unit 402 establishes the connection with the host computer from which the connection request was transmitted (S2003), and obtains the IP address of the host computer in question (S2004).

Subsequently, the host judgment unit 403 judges by a later-described method whether or not the IP address obtained in the step S2004 exists in the list (host list) of the IP addresses of the host computers from which data reception should be refused (S2005). Here, it should be noted that the host list is stored in the storage unit 407. Then, when judged that the obtained IP address does not exist in the host list, the host judgment unit 403 receives print data subsequently transmitted from the host computer (S2006), and transmits the received print data to the image-generation unit 405 (S2007).

When all the print data are received, the host computer is then disconnected (S2008), and the print application unit 404 waits until a next connection request is received (S2002).

Meanwhile, when judged in the step S2005 that the IP address of the host computer which transmitted the connection request exists in the host list, the establish connection is disconnected (S2008), and the print application unit 404 waits until the next connection request is received (S2002).

Figure 10:
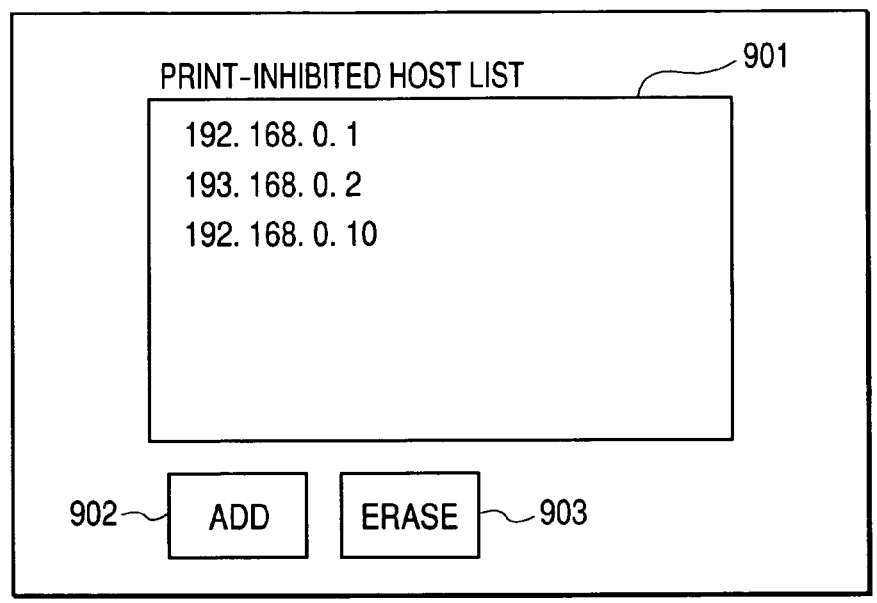
FIG. 10 is a diagram showing an example of a print-inhibited (or print-rejected) host registration screen displayed on the operation unit shown in FIG. 2.
Figure 11:
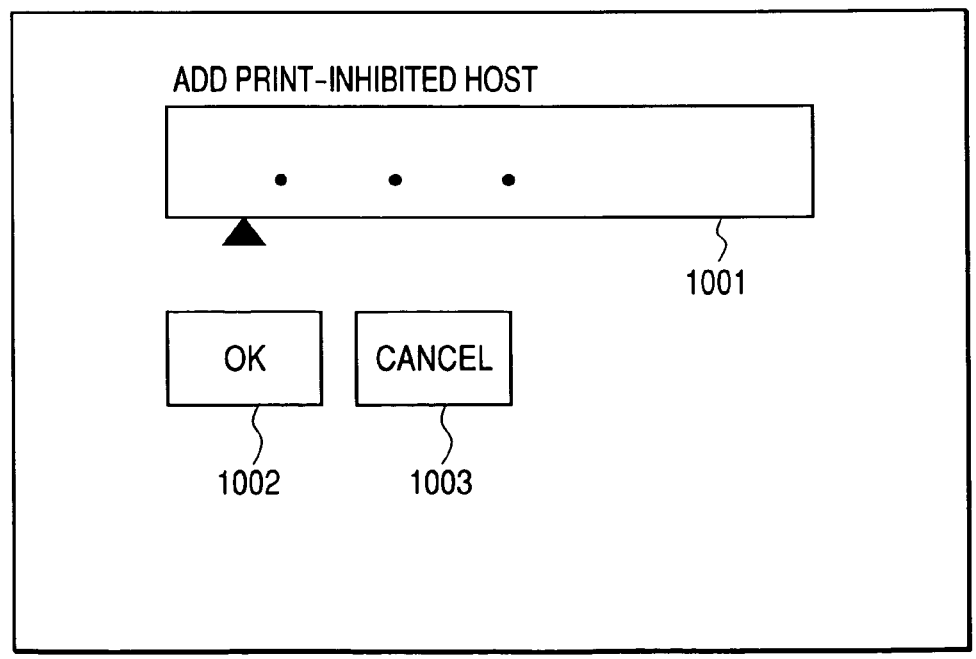
FIG. 11 is a diagram showing an example of a print-inhibited host addition screen displayed on the operation unit shown in FIG. 2.

FIGS. 10 and 11 are diagrams showing an example of a print-inhibited (or print-rejected) host registration screen displayed on the operation unit 309 shown in FIG. 2. More specifically, FIGS. 10 and 11 show the example of the screen through which the host computer that printing is inhibited is registered, in the host information registration unit 406 according to the embodiment.

As shown in FIG. 10, in the embodiment, the host information registration unit 406 is constituted by an operation panel of the image formation apparatus 202, whereby the user inputs necessary host information through a touch panel. Of course, it is possible to cause each of the computers 201, 203 and 204 on the network to transmit the input host information to the image formation apparatus 202 and then write the transmitted information in the storage unit 407 through the network, by appropriately executing the program corresponding to the host information registration unit.

The host information registration screen shown in FIG. 10 includes an area 901 for displaying the IP addresses of the host computers that the printing is currently inhibited, a button 902 for adding a host computer, and a button 903 for erasing the registered computer. Then, when the button 902 is depressed by the user, the host information registration screen shown in FIG. 10 is changed to the host (information) addition screen shown in FIG. 11.

In FIG. 11, the host information addition screen includes an area 1001 to which the IP address of the host computer is input, a button 1002 for deciding the input IP address, and a button 1003 for canceling the input.

On the host information addition screen shown in FIG. 11, the user inputs the IP address of the print-inhibited host computer by using hard keys such as numeric keys or the like (not shown), and then decides the input IP address by depressing the button 1002. Thus, the host information addition screen shown in FIG. 11 is returned to the host information registration screen shown in FIG. 10, and the newly input IP address is additionally displayed in the area 901.

In the above example, the IP address is registered as the host information. However, it is also possible to input the host name of the host computer, obtain the IP address from the input host name, and then register the obtained IP address on the host list.

Next, the case where the name of the print-inhibited host computer is input in the host information registration unit 406 will be explained.

Figure 12:
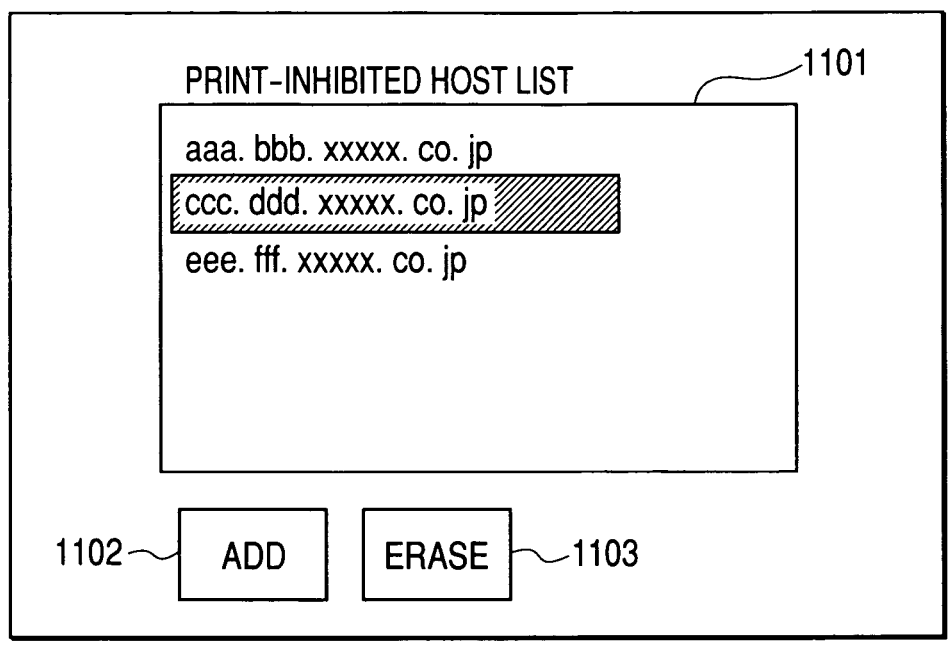
FIG. 12 is a diagram showing an example of a print-inhibited host computer name input screen displayed on the operation unit shown in FIG. 2.
Figure 13:
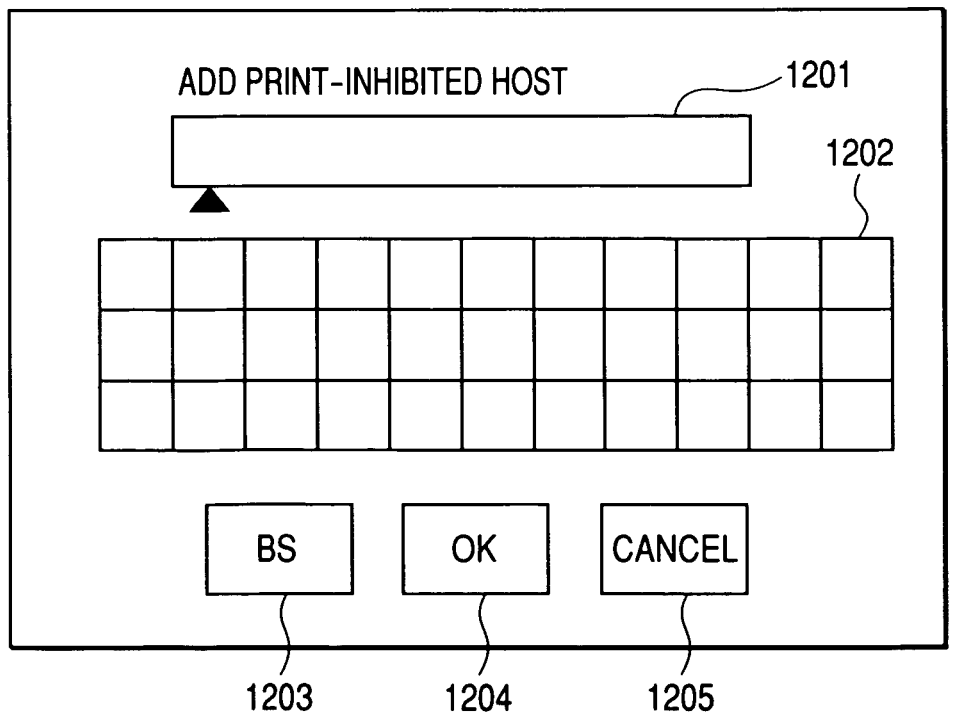
FIG. 13 is a diagram showing an example of a print-inhibited host computer information addition screen displayed on the operation unit shown in FIG. 2.

FIGS. 12 and 13 are diagrams showing an example of a print-inhibited host computer name input screen displayed on the operation unit 309 shown in FIG. 2. More specifically, FIGS. 12 and 13 show the example of the screen through which the host computer that printing is inhibited is registered, in the host information registration unit 406 according to the embodiment.

The host information registration screen shown in FIG. 12 includes an area 1101 for displaying a list of the host names of the host computers which are set so that the printing is currently inhibited, a button 1102 for adding a host computer, and a button 1103 for erasing the registered computer.

More specifically, the host names of the host computers currently set are displayed in the area 1101. In this area, the IP addresses of the host computers represented by the black characters can be obtained and their settings are currently valid, and the IP address of the host computer represented by hatching (or shading) cannot be obtained from the input host name and its setting is currently invalid. When the button 1102 is depressed by the user, the screen shown in FIG. 12 is changed to a host information addition screen shown in FIG. 13.

The host information addition screen shown in FIG. 13 includes an area 1201 in which a host name of the host computer is input, a software key 1202, a button 1203 for erasing one character in the input host name, a button 1204 for deciding the input host name, and a button 1205 for canceling the input.

On the host information addition screen, the user inputs the host name of the print-inhibited host computer by using the software key 1202 on the touch panel, and then decides the input name by depressing the button 1204. Thus, the screen shown in FIG. 13 is returned to the host registration screen shown in FIG. 12, and the newly input host name of the host computer is displayed with hatching (or shading) at first in the area 1101.

Subsequently, the user tries to obtain the IP address from the newly input host name by using the DNS server. When the IP address of the host computer can be obtained from the DNS server, the hatching (or shading) in the area 1101 shown in FIG. 12 is changed to the black characters, and the setting is valid. Meanwhile, when the IP address of the host computer cannot be obtained, the hatching (or shading) in the area 1101 is maintained as it is.

Incidentally, the host computer that the printing is inhibited (i.e., print-inhibited host computer) can be specified from a past print history. For example, the user watches the print history to confirm whether or not useless printing is performed. Then, when it is confirmed that the useless printing is performed, the user inhibits the printing for the host computer of the print job transmission source.

Next, selecting the print-inhibited host computer from the past print history will be explained.

Figure 14:
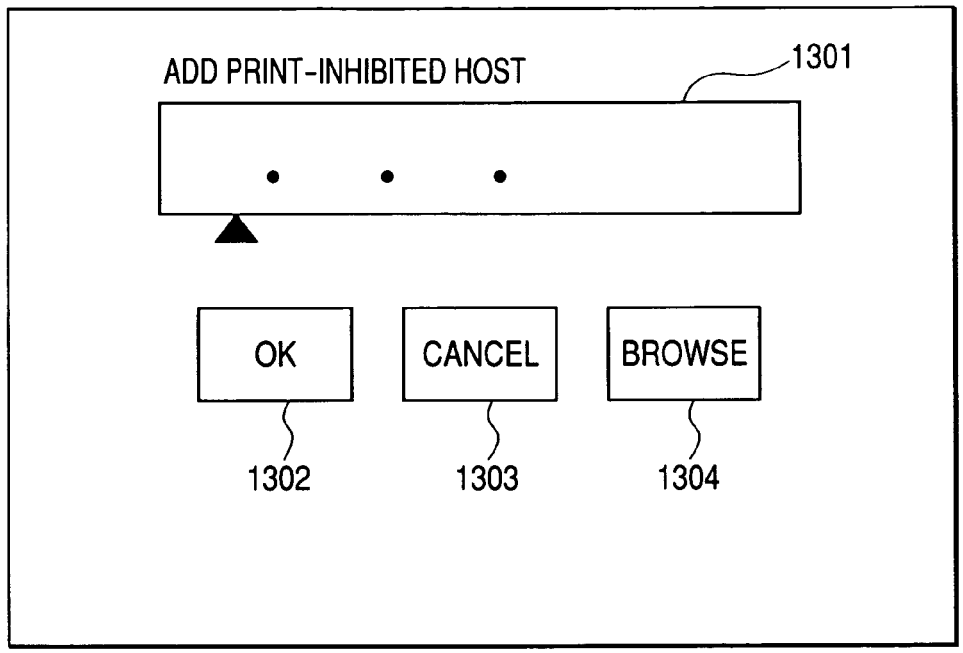
FIG. 14 is a diagram showing an example of the print-inhibited host computer information addition screen displayed on the operation unit shown in FIG. 2.

When the button 902 for adding the host computer is depressed on the host information registration screen shown in FIG. 10, a print-inhibited host computer information addition screen shown in FIG. 14 is displayed.

FIG. 14 is the diagram showing an example of the print-inhibited host computer information addition screen displayed on the operation unit 309 shown in FIG. 2.

In FIG. 14, the host information addition screen includes an area 1301 to which the IP address of the host computer is input, a button 1302 for deciding the input IP address, a button 1303 for canceling the input IP address, and a button 1304 for displaying the print history. Here, it should be noted that the print history shows what printing was performed. In any case, when the button 1304 is depressed on the host information addition screen, a print history screen shown in FIG. 15 is displayed.

Figure 15:
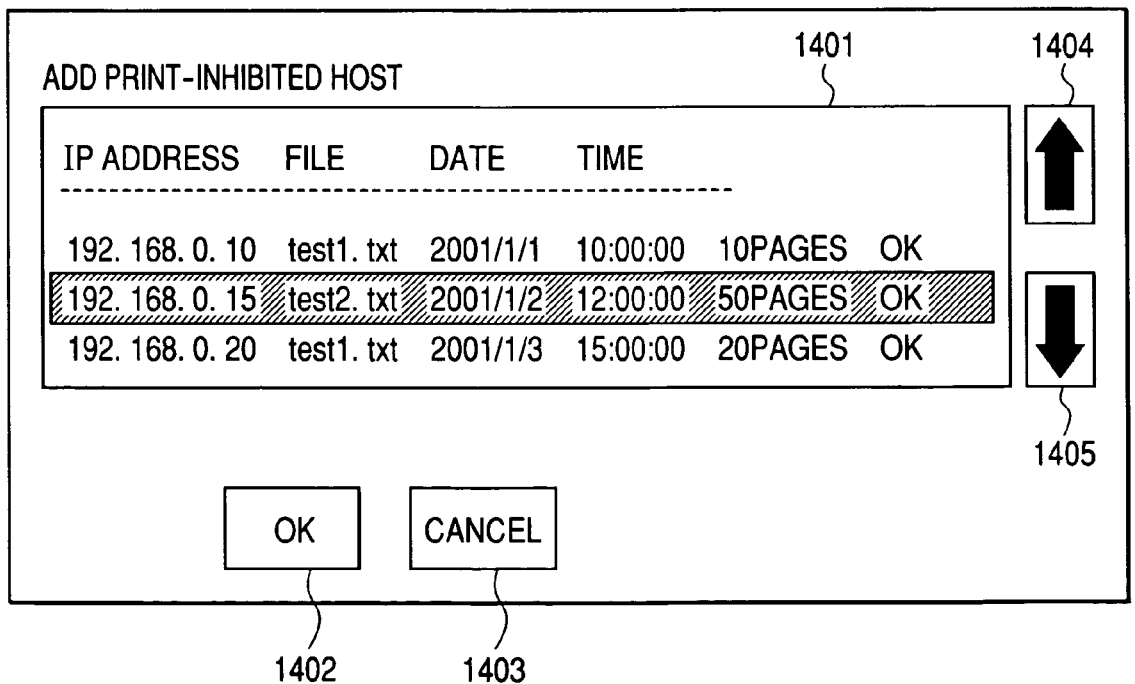
FIG. 15 is a diagram showing an example of a print history display screen displayed on the operation unit shown in FIG. 2.

FIG. 15 is the diagram showing an example of the print history display screen displayed on the operation unit 309 shown in FIG. 2.

In FIG. 15, the print history display screen includes a print history information display screen 1401 which displays print history information consisting of the IP address of the host computer that printing was performed, the file name, the date and time, the number of output pages and the output result, a button 1402 for deciding the selected host, a button 1403 for stopping the print history display and returning to the host information addition screen shown in FIG. 14, and buttons 1404 and 1405 for scrolling the history.

On the print history display screen, the user selects the host computer that printing is inhibited (i.e., print-inhibited host computer) from the print history, and handles the buttons 1404 and 1405 so that the line representing the history of the selected host computer is displayed with hatching (or shading). Thus, the line including the selected host computer is displayed with hatching (or shading).

In the example of FIG. 15, the host computer of which the IP address is "192.168.0.15" is selected. Then, when the button 1402 is depressed, the selected host computer is decided, the print history display screen shown in FIG. 15 is returned to the host information addition screen shown in FIG. 14, and the IP address of the selected host computer is displayed in the area 1301.

Then, when the button 1302 is depressed, the host information addition screen shown in FIG. 14 is returned to the host information registration screen shown in FIG. 10, and the IP address of the selected host computer is added and displayed in the area 901.

Subsequently, the method of permitting or inhibiting the printing based on the registered host information and the registered user information according to the embodiment will be explained. More specifically, the process to be performed when the data is received by the print application unit 404 according to the embodiment will be explained with reference FIG. 16.

Figure 16:
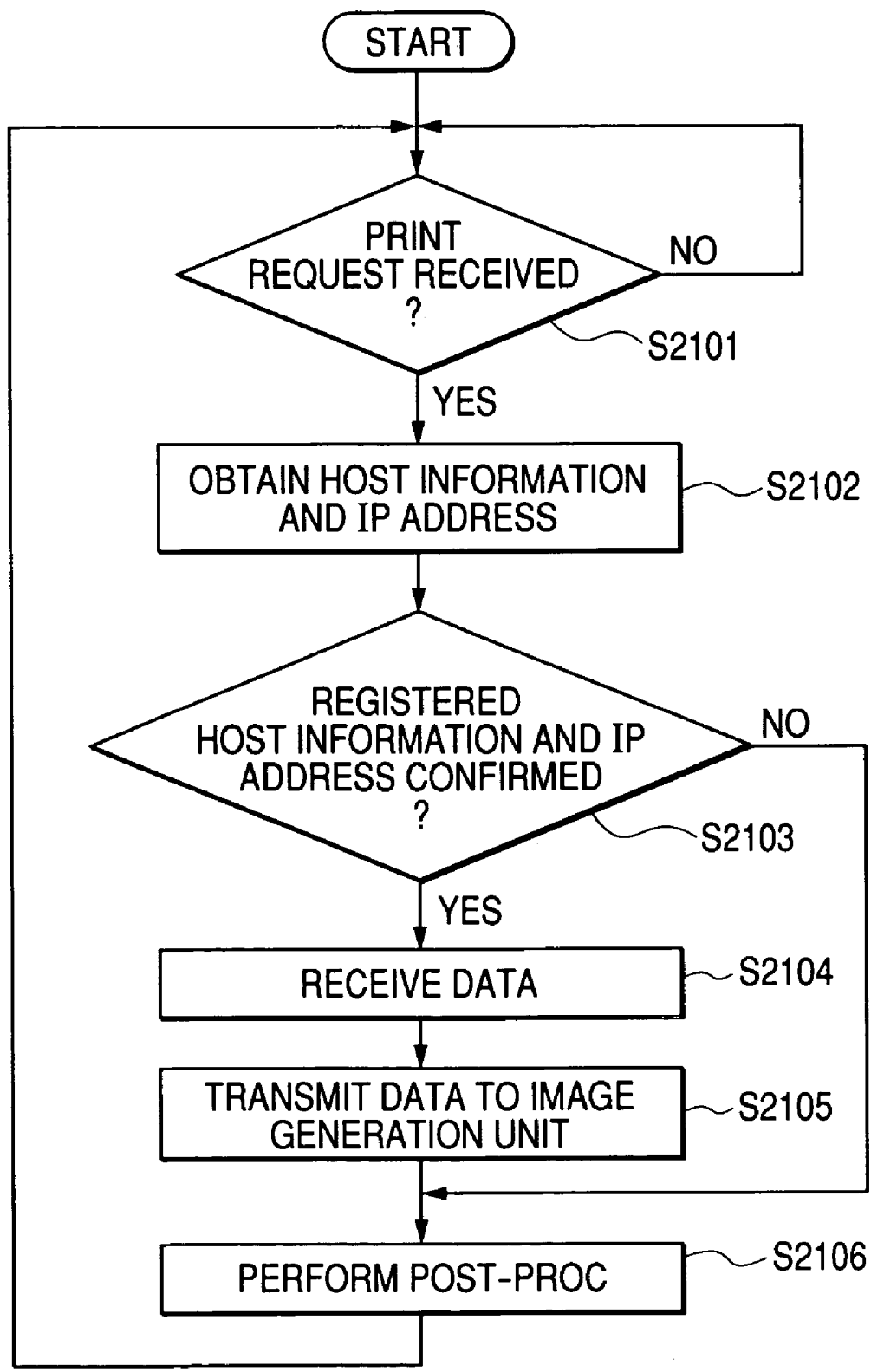
FIG. 16 is a flow chart showing an example of a third data processing procedure to be performed in the image formation apparatus according to the present invention.

FIG. 16 is the flow chart showing an example of a third data processing procedure to be performed in the image formation apparatus according to the embodiment. Here, it should be noted that the third data processing procedure corresponds to the processing procedure to be performed when the data is received by the print application unit 404, and symbols S2101 to S2106 in FIG. 16 denote procedure steps respectively.

First, it is judged whether or not the print request (or connection request) is received (S2101). When judged that the print request (or connection request) is received, the IP address of the host computer and the user name included in the received print request (or connection request) are obtained (S2102). Then, the obtained IP address and the obtained user name are checked on the basis of the host information and the user information both previously registered in the image formation apparatus (S2103).

Here, it should be noted that the host information and the user information previously registered in the image formation apparatus are obtained by additionally registering the user information to the host list stored in the storage unit 407.

When it is determined based on the above check to accept the print request (or connection request), the flow advances to the step S2104. Meanwhile, when it is determined not to accept the print request (or connection request), the flow advances to the step S2106 to perform a post-process without performing the printing. Then, the flow returns to the step S2101 to wait for a next print request (or connection request).

In the step S2104, the data is continuously received. Then, in the step S2105, the received print data is transferred to the image generation unit, thereby performing the printing. Subsequently, the flow advances to the step S2106 to perform the post-process, and then returns to the step S2101.

Incidentally, the image formation apparatus may include the list (print-permitted host list) of the IP addresses of the host computers that printing is permitted and the list (print-inhibited host list) of the IP addresses of the host computers that printing is inhibited.

Next, a case where the image formation apparatus includes both the print-permitted host list and the print-inhibited host list will be explained.

Figure 17:
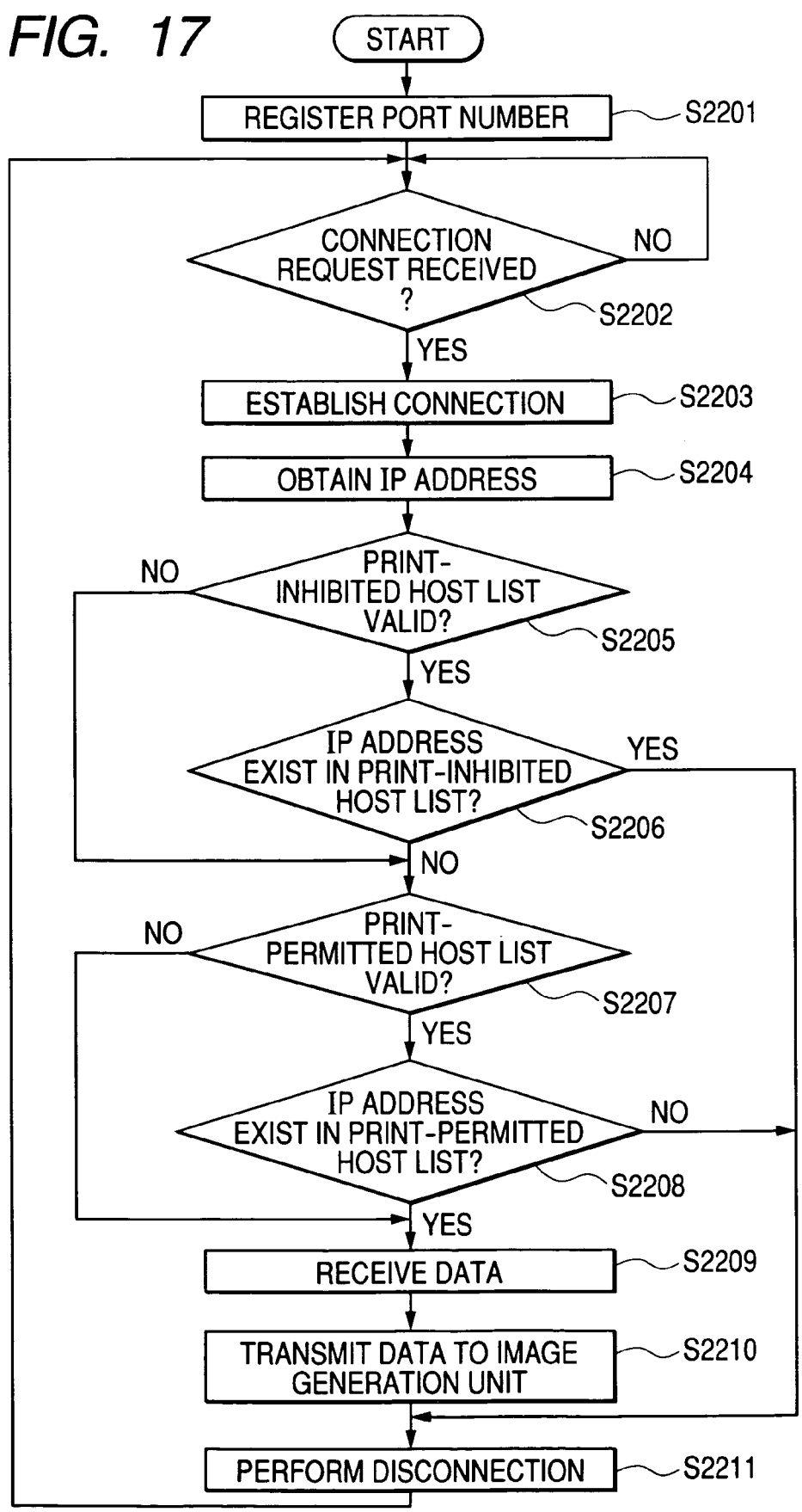
FIG. 17 is a flow chart showing an example of a fourth data processing procedure to be performed in the image formation apparatus according to the present invention.

FIG. 17 is a flow chart showing an example of a fourth data processing procedure to be performed in the image formation apparatus according to the present invention. Here, it should be noted that the fourth data processing procedure corresponds to the processing procedure to be performed when the data is received by the print application unit 404, and symbols S2201 to S2211 in FIG. 17 denote procedure steps respectively.

First, in the initial stage, the print application unit 404 registers, to the protocol processing unit 402, a port number through which the data is received (S2201), and waits until a connection request is received from the network (S2202) Then, when the connection request is received from the network, the protocol processing unit 402 establishes the connection with the host computer from which the connection request was transmitted (S2203), and obtains the IP address of the host computer in question (S2204).

Subsequently, the host judgment unit 403 judges by a later-described method whether or not the print-inhibited host list stored in the storage unit 407 is valid (S2205). When judged that the stored print-inhibited host list is not valid, the flow advances to the step S2207.

Meanwhile, when judged in the step S2205 that the stored print-inhibited host list is valid, the host judgment unit 403 judges whether or not the IP address obtained in the step S2204 exists in the print-inhibited host list (S2206). Then, when judged that the obtained IP address does not exist in the print-inhibited host list, the flow advances to the step S2207. Meanwhile, when judged that the obtained IP address exists in the print-inhibited host list, the flow advances to the step S2211 without performing the print process based on the data from the host computer because the printing of the host computer in question is inhibited. Then, the host computer is disconnected (S2211), and the flow returns to the step S2202.

On one hand, in the step S2207, the host judgment unit 403 judges by a later-described method whether or not the print-permitted host list stored in the storage unit 407 is valid. When judged that the stored print-permitted host list is not valid, the flow advances to the step S2209. Meanwhile, when judged in the step S2207 that the stored print-permitted host list is valid, the host judgment unit 403 further judges whether or not the IP address obtained in the step S2204 exists in the print-permitted host list (S2208). Then, when judged that the obtained IP address does not exist in the print-permitted host list, the flow advances to the step S2211 without performing the print process based on the data from the host computer because the printing of the host computer in question is inhibited. Then, the host computer is disconnected (S2211), and the flow returns to the step S2202.

Meanwhile, when judged in the step S2208 that the obtained IP address exists in the print-permitted host list, the print data transmitted from the host computer is continuously received (S2209), and the received print data is transferred to the image generation unit 405 (S2210) . When the reception of all the print data ends, all the host computers are disconnected (S2211), and it waits for a next connection request.

FIGS. 18 to 21 are diagrams respectively showing examples of an IP address range setting screen displayed on the operation unit 309 shown in FIG. 2. Here, it should be noted that the IP address range setting screen is used to register the print-inhibited or print-permitted host computer in the host information registration unit 406.

In the embodiment, the host information registration unit 406 is constituted by the operation panel of the image formation apparatus 202, whereby the user inputs necessary host information through the touch panel. Of course, it is possible to cause each of the computers 201, 203 and 204 on the network to transmit the input host information to the image formation apparatus 202 and then write the transmitted information in the storage unit 407 through the network, by appropriately executing the program corresponding to the host information registration unit.

Figure 18:
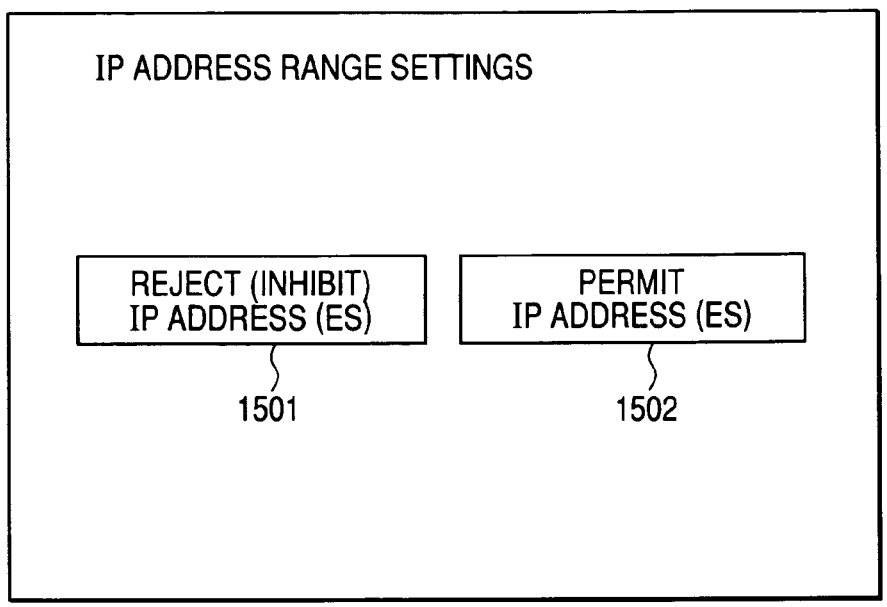
FIG. 18 is a diagram showing an example of an IP address range setting screen displayed on the operation unit shown in FIG. 2.

The host information registration screen shown in FIG. 18 includes a button 1501 for starting to register the print-inhibited (or print-rejected) host computer, and a button 1502 for starting to register the print-permitted host computer. Here, because the procedure to register the print-inhibited host computer is quite the same as that to register the print-permitted host computer, only an example of registering the print-inhibited host computer will be explained hereinafter. First, when the button 1501 on the host information registration screen shown in FIG. 18 is depressed, the screen is changed to an inhibited-host registration screen shown in FIG. 19. Here, it should be noted that the inhibited-host registration screen is also called a print-inhibited host registration screen.

Figure 19:
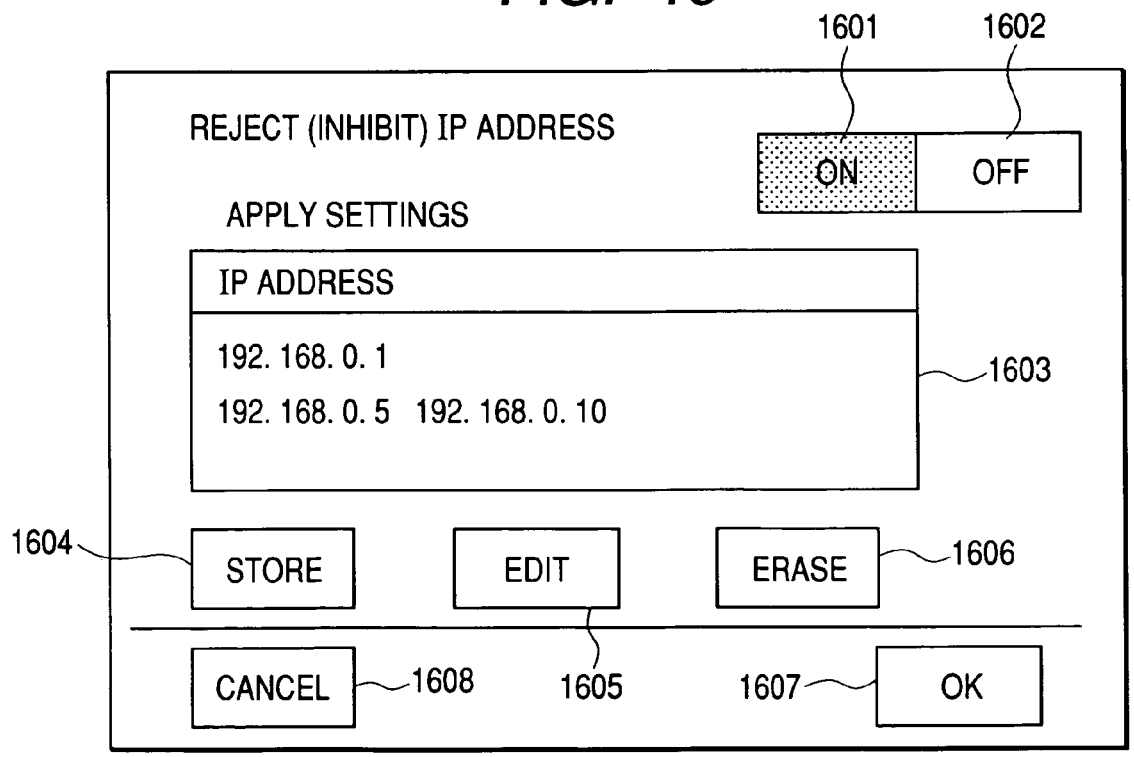
FIG. 19 is a diagram showing an example of the IP address range setting screen displayed on the operation unit shown in FIG. 2.

The inhibited-host registration screen shown in FIG. 19 includes a button 1601 for validating the print-inhibited host list, a button 1602 for invalidating the print-inhibited host list, an area 1603 for displaying the IP addresses of the host computers that the printing is currently inhibited, a button 1604 for adding a host computer, a button 1605 for editing the IP addresses of the host computers, a button 1606 for erasing the registered host computer, a button 1607 for revoking the change of the print-inhibited host list and returning to the host information registration screen shown in FIG. 18, and a button 1608 for writing the change of the print-inhibited host list in the storage unit 407 and returning to the host information registration screen shown in FIG. 18.

Figure 20:
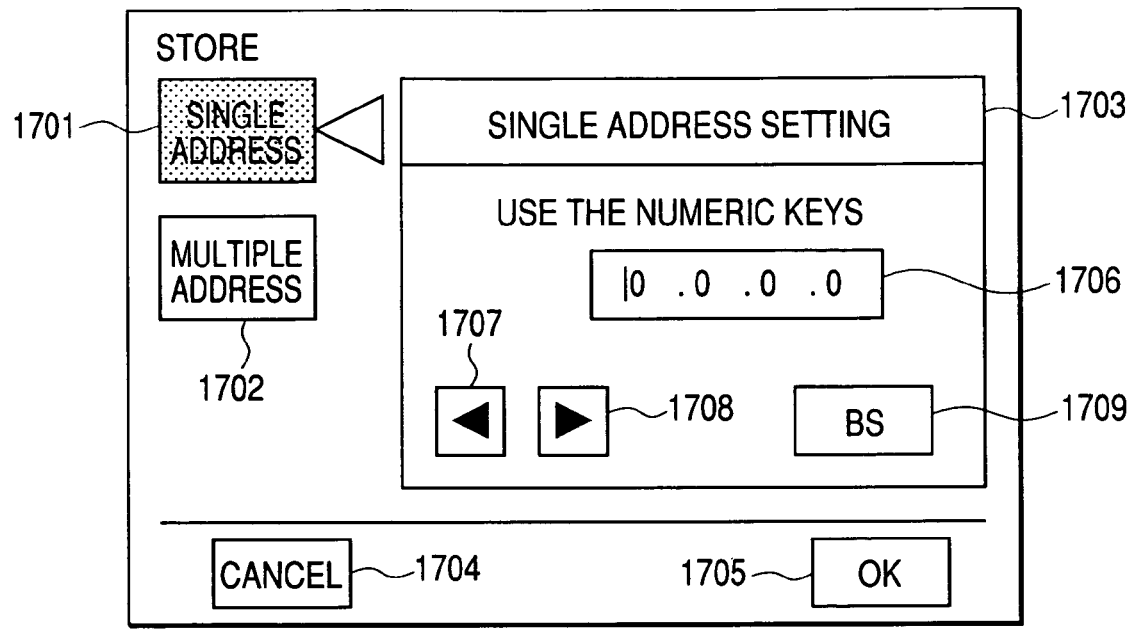
FIG. 20 is a diagram showing an example of the IP address range setting screen displayed on the operation unit shown in FIG. 2.

On the inhibited-host registration screen shown in FIG. 19, when the button 1601 is depressed to validate the print-inhibited host list and then the button 1604 is depressed, the screen is changed to an inhibited-host addition screen shown in FIG. 20.

Incidentally, when the button 1601 is depressed, a flag indicating that the print-inhibited host list is valid is set. On the contrary, when the button 1602 is depressed, the flag indicating that the print-inhibited host list is valid is released. Based on whether or not the flag is set, the host judgment unit 403 judges whether or not the print-inhibited host list is valid. Likewise, based on whether the flag indicating that the print-permitted host list is valid is set or released, the host judgment unit 403 judges whether or not the print-permitted host list is valid.

The inhibited-host addition screen shown in FIG. 20 includes a button 1701 for selecting a single address input mode of inputting only one IP address of the print-inhibited host computer, a button 1702 for selecting a multiple address input mode of inputting the range of the IP addresses of the print-inhibited host computers, a single address input window 1703, a button 1704 for revoking the input content and returning to the inhibited-host registration screen shown in FIG. 19, and a button 1705 for returning to the inhibited-host registration screen shown in FIG. 19 in the state that the input IP address is reflected.

The single address input window 1703 includes an area 1706 for inputting the IP address of the host computer, buttons 1707 and 1708 for respectively shifting the cursor leftward and rightward in the area 1706, and a button 1709 for erasing or canceling one character in the area 1706. Because the single address input mode is set on the inhibited-host addition screen of FIG. 20 in an initial condition, the user inputs the IP address of the print-inhibited host computer by using hard keys such as numeric keys or the like (not shown), and decides the input IP address by depressing the button 1705. Thus, the screen shown in FIG. 20 returns to the inhibited-host registration screen shown in FIG. 19, and the newly input IP address is added and displayed in the area 1603.

Figure 21:
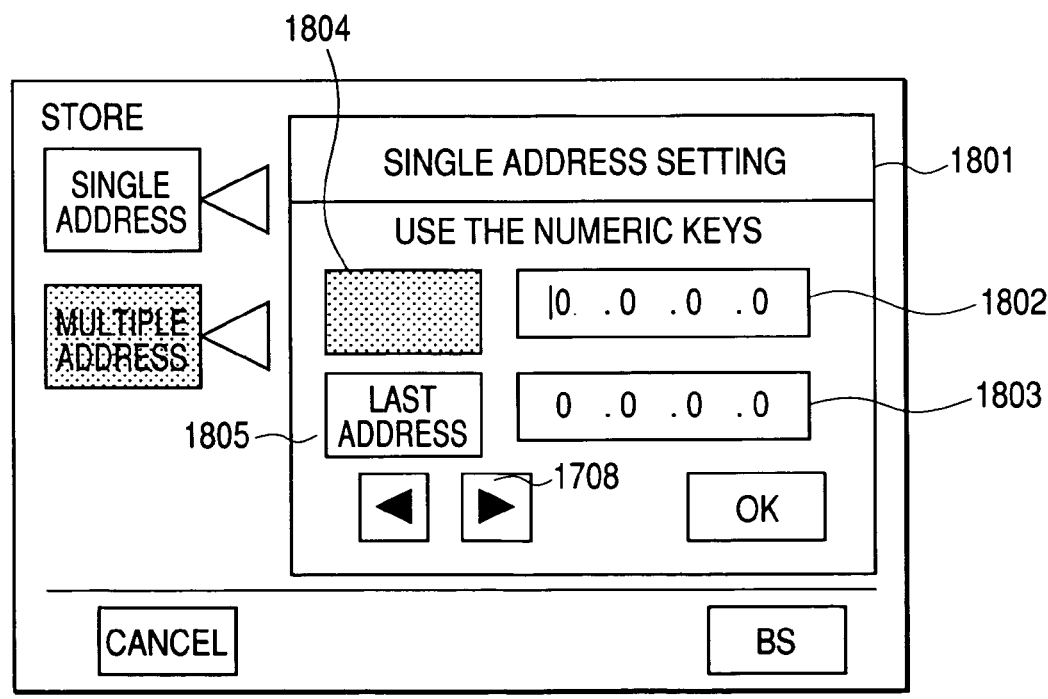
FIG. 21 is a diagram showing an example of the IP address range setting screen displayed on the operation unit shown in FIG. 2.

Incidentally, when the button 1702 on the inhibited-host addition screen shown in FIG. 20 is depressed by the user, a multiple address input window 1801 shown in FIG. 21 is displayed.

In FIG. 21, the multiple address input window 1801 includes an area 1802 for inputting the start address of the range of the IP addresses of the print-inhibited host computers, an area 1803 for inputting the end address of the range of the IP addresses of the print-inhibited host computers, a button 1804 for activating the area 1802, and a button 1805 for activating the area 1803.

On the screen shown in FIG. 21, the user inputs the range of the IP addresses of the print-inhibited host computers respectively to the areas 1802 and 1803 by using hard keys (not shown), and decides the input IP addresses by depressing the button 1805. Thus, the screen shown in FIG. 21 returns to the inhibited-host registration screen shown in FIG. 19, and the newly input IP address of the range in question is added and displayed in the area 1603. For example, when "1.2.3.4" and "1.2.3.7" are input respectively as start and end addresses, the IP addresses "1.2.3.4", "1.2.3.5", "1.2.3.6" and "1.2.3.7" are added to the inhibited-host list.

As just described, the image formation apparatus provides the print-inhibited host list and the print-permitted host list, whereby it is easy for the user to perform various settings.

For example, when the number of the host computers of which print inhibition is intended is small or when the number of the host computers of which print permission is intended is large, the print-inhibited host list is validated so that the corresponding host computers are registered on the. print-inhibited host list.

Moreover, for example, when the number of the host computers of which print inhibition is intended is large or when the number of the host computers of which print permission is intended is small, the print-permitted host list is validated so that only the host computers of which print inhibition is unnecessary are registered on the print-permitted host list.

The host list stored in the storage unit 407 is provided with respect to each user of the image formation apparatus, and associated with the user ID of the user who uses the image formation apparatus. Besides, the host list includes a default host list of the image formation apparatus which is not associated with any user.

As just described, it is possible to provide the image formation apparatus which can perform the print process for only the print (connection) requests transmitted from the limited host computers or users.

Hereinafter, in the embodiment, an operation procedure of the image formation system to be performed in a case where the host list is changed (or switched) with respect to each user discriminated by a discrimination means will be explained.

Figure 22:
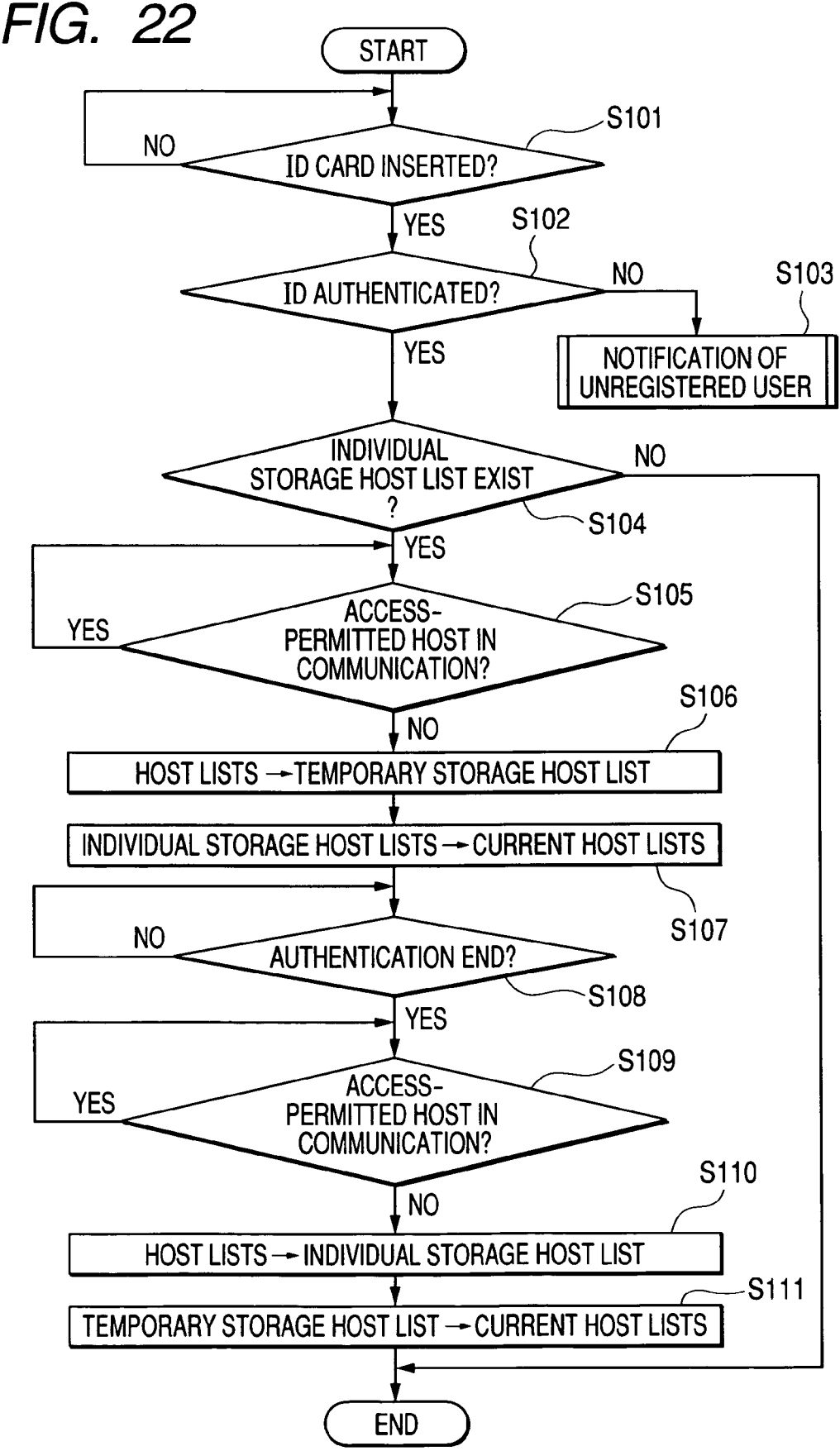
FIG. 22 is a flow chart showing an example of a fifth data processing procedure to be performed in the image formation apparatus according to the present invention.

FIG. 22 is a flow chart showing an example of a fifth data processing procedure to be performed in the image formation apparatus according to the present invention. Here, it should be noted that the fifth data processing procedure corresponds to the host authentication processing procedure to be performed by the CPU 302 of the main controller 301, and symbols S101 to S111 in FIG. 22 denote procedure steps respectively.

In the embodiment, the authentication is performed by using the card reader and the magnetic card in the image formation apparatus. Here, because the code corresponding to the card ID is stored in the individual magnetic card, the authentication fails when an unregistered code is detected by the card reader. Besides, the card to be used for the authentication is not limited to the magnetic card, that is, a contact IC card or a non-contact IC card may be used. Moreover, the user authentication in the image formation apparatus may be performed without using a card. In this case, for example, when the user inputs the user ID and the password through the operation unit 309 of the image formation apparatus, it is authenticated based on the input user ID and password whether the user in question is a proper user.

Incidentally, in the state that the magnetic card is not inserted in the card reader, common default setting is used for the host list. Moreover, it is assumed that an individual ID or a group ID can be judged from the inserted card.

In the image formation apparatus, when it is detected in a step S101 that the ID card is inserted, the flow advances to a step S102. Meanwhile, when it is not detected that the ID card is inserted, the operation in the step S102 is repeated.

Then, it is judged in the step S102 whether or not the ID authentication in the ID card succeeds. When judged that the ID authentication succeeds, the flow advances to a step S104. Meanwhile, when judged in the step S102 that the ID authentication does not succeed, the flow advances to a step S103 to display an error screen (not shown) for notifying the user that the authentication failed.

On one hand, in the step S104, it is further judged whether or not an individual storage host list for the user authenticated in the step S102 exists. Here, it should be noted that, in the storage unit 407, the individual storage host list has been stored with respect to each of the authenticated users.

In any case, when judged in the step S104 that the individual storage host list for the authenticated user exists in the storage unit 407, the flow advances to a step S105. Meanwhile, when judged in the step S104 that the individual storage host list does not exist, the process ends.

Then, in the step S105, it is further judged whether or not the host that the accessing is currently permitted (also called access-permitted host) is in communication. When judged that the access-permitted host is in communication, the judgment in the step S105 is repeated. Meanwhile, when judged that the access-permitted host is not in communication, the flow advances to a step S106 to store the current print-inhibited and print-permitted host lists in a temporary storage host list.

Then, in a step S107, the contents of the individual storage host list which is inherent for the user in question are replaced with the current print-inhibited and print-permitted host lists.

Next, in a step S108, it is judged whether or not a valid period of authentication ends, or it is judged whether or not the user performs an explicit logoff operation (for example, whether or not the magnetic card is removed). When judged that the authentication ends, the flow advances to a step S109. Meanwhile, when judged in the step S108 that the authentication does not end, the judgment in the step S108 is repeated.

Subsequently, in the step S109, it is further judged whether or not the host that the access-permitted host is in communication. When judged that the access-permitted host is in communication, the judgment in the step S109 is repeated until the communication ends. Meanwhile, when judged that the access-permitted host is not in communication, the flow advances to a step S110 to store the contents of the current print-inhibited and print-permitted host lists in the individual storage host list.

Then, in a step S111, the contents of the temporary storage host list are replaced with the current print-inhibited and print-permitted host lists, and the process ends.

Thus, it is possible to set, in parallel, the environment of enabling/disabling to perform the image process based on the print-inhibited and print-permitted host lists inherently set and registered in the apparatus and the environment of enabling/disabling to perform the temporary image process based on the print-inhibited and print-permitted host lists set and registered by the authenticated user. As a result, it is possible to dynamically change or switch the data reception processing state in the image formation apparatus.

Hereinafter, the architecture of data processing programs readable by the image formation apparatus according to the present invention will be explained with reference to a memory map shown in FIG. 23.

FIG. 23 is the diagram for explaining the memory map of the storage medium which stores the various data processing programs readable by the image processing apparatus according to the present invention.

Incidentally, although it is not illustrated specifically, also information (e.g., version information, creator information, etc.) for administrating the program groups stored in the storage medium may occasionally be stored in the storage medium, and information (e.g., icon information for discriminatively displaying a program, etc.) depending on an OS or the like on the program reading side may occasionally be stored in the storage medium.

Moreover, the data depending on the various programs are administrated on the directory of the storage medium. Besides, a program to install various programs into a computer, a program to uncompress installed programs and data when the installed programs and data have been compressed, and the like are occasionally stored.

Furthermore, the functions shown in FIGS. 4, 9, 16, 17 and 22 may be executed by a host computer based on externally installed programs. In that case, the present invention is applicable even in a case where an information group including programs is supplied from a storage medium (such as a CD-ROM, a flash memory, an FD or the like) or an external storage medium through a network to an output apparatus.

Incidentally, it is needless to say that the object of the present invention can be achieved in a case where the storage medium storing the program codes of software to realize the functions of the above embodiment is supplied to a system or an apparatus and then a computer (or CPU or MPU) in the system or the apparatus reads and executes the program codes stored in the storage medium.

In that case, the program codes themselves read from the storage medium realize the new functions of the present invention, whereby the storage medium storing these program codes constitutes the present invention.

Therefore, because the form of program is no object if it has an actual function as the program, an object code, a program executed by an interpreter, script data supplied to an OS, and the like may be included as the program.

As the storage medium for supplying the program codes, for example, a flexible disk, a hard disk, an optical disk, a magnetooptical disk, a CR-ROM, a CD-R, a CD-RW, a DVD-ROM, a magnetic tape, a nonvolatile memory card, a ROM, an EEPROM, a silicon disk or the like can be used.

In this case, the program codes themselves read from the storage medium realize the functions of the above embodiment, whereby the storage medium storing these program codes constitutes the present invention.

Besides, as a method of supplying programs, there is a method of connecting with a home page on the Internet by using a browser of a client computer, and downloading the computer program itself of the present invention or a compressed file including an automatic installing function together with the computer program into the recording medium such as a hard disk or the like. Moreover, there is a method of dividing the program codes constituting the program of the present invention into plural files and downloading the respective files from different home pages. That is, a WWW server, an FTP (file transfer protocol) server and the like for downloading the program files for achieving the function processes of the present invention with use of the computer to plural operators are included in the scope of the present invention.

Moreover, it is possible to encrypt the program of the present invention, store the encrypted program in a storage medium such as a CD-ROM or the like, distribute the obtained storage media to users, cause the user who has satisfied a predetermined condition to download key information for decrypting the encrypted program from the home page through the Internet, cause the user in question to install the decrypted program into an appropriate computer, and thus achieve the functions of the present invention.

Moreover, it is needless to say that the present invention includes not only a case where the functions of the above embodiment are realized by executing the program codes read by the computer, but also a case where an OS (operating system) or the like functioning on the computer executes a part or all of the actual process according to instructions of the program codes, whereby the functions of the above embodiment are achieved by that process.

Furthermore, it is needless to say that the functions of the above embodiment can be achieved in a case where the program read from the storage medium is once written in a memory provided in a function expansion board inserted in the computer or a function expansion unit connected to the computer, and then a CPU or the like provided in the function expansion board or the function expansion unit executes a part or all of the actual process according to the instructions of the program.

While the present invention has been described with reference to what is presently considered to be the preferred embodiment, it is to be understood that the invention is not limited to the disclosed embodiment. On the contrary, the present invention is intended to cover various modifications and equivalent arrangements (including the organic combination of respective embodiments) included within the spirit and scope of the appended claims. The scope of the following claims is to be accorded the broadest interpretation so as to encompass all such modifications and equivalent structures and functions.

Although the embodiment has been explained by way of various examples, it is apparent for one of ordinary skill in the art that the purpose and the scope of the present invention are not limited to the specific explanations described in the present application.

Incidentally, the present invention is not limited to the above embodiment. That is, various modifications are of course possible within the range not departing from the scope of the present invention.

According to the above embodiment, in the image formation apparatus, it is possible to switch from the print-inhibited host list to the print-permitted host list and vice versa in accordance with the authentication result, whereby the external apparatus capable of communicating with the image formation apparatus can be limited with respect to each authenticated user. Thus, it is possible to raise security level, and it is possible to occupy the services only among the apparatuses capable of performing the communication. Moreover, when the user that the accessing is currently permitted is in communication, the setting is not changed until the accessing ends. Thus, the communication is not interrupted, whereby reliability improves.

Although the magnetic card is used as the authentication means in the above embodiment, the present invention is not limited to this. That is, other recording media such as an IC card, a card on which a non-contact recording medium is mounted, and the like may be inserted into the card reader. Moreover, even if the image formation apparatus does not have any card reader, the user may manually input the ID and the password through the operation panel of the image formation apparatus for authentication based on the input ID and password instead of the card reader.

Moreover, the present invention may be applied to a system consisting of plural devices (e.g., host computer, interface equipment, reader, printer, and the like), or to an apparatus comprising a single device (e.g., copying machine, facsimile machine, or the like).

Moreover, the above explained image formation control software according to the present invention may be applied by executing the externally installed program by means of the computer 201. In that case, the program is supplied to the host computer by loading the information group including the program in question from an external storage medium to the RAM of the host computer through a storage medium such as a CD-ROM, a flash memory, flexible disk or the like, or through a network such as an electronic mail, personal computer communication. It should be noted that the present invention is also applied to that case.

This application claims priority from Japanese Patent Application No. 2003-385059 filed Nov. 14, 2003, which is hereby incorporated by reference.

What is claimed is:

1. An image formation apparatus that receives data transmitted from one or more external apparatuses connected through a network and processes the data received, the apparatus comprising:

a memory unit storing transmission source information specifying the external apparatuses associated with user information specifying one or more users of the image formation apparatus, wherein each user specified by user information is associated with at least one of the external apparatuses specified by transmission source information;

a user information receiving unit adapted to receive user information input by a user of the image formation apparatus;

an authentication unit adapted to authenticate the user of the image formation apparatus based on the user information received by the user information receiving unit; and a control unit adapted to control the image formation apparatus, in response to the authentication unit authenticating the user, not to accept data from an external apparatus other than the at least one of the external apparatuses specified by the transmission source information that is associated with the user specified by the user information of the authenticated user.

2. An image formation apparatus according to claim 1, wherein the memory unit farther stores second transmission source information for specifying one or more external apparatuses that are not associated with user information, and in a case in which the authentication unit does not authenticate the user, the control unit controls the image formation apparatus not to accept data from any external apparatus other than the one or more external apparatuses specified by the second transmission source information.

3. An image formation apparatus according to claim 2, wherein, in a case that the image formation apparatus changes from a first state, in which the authentication unit does not authenticate the user, to a second state, in which the authentication unit authenticates the user, a communication with an external apparatus that began before the authentication unit authenticates the user, continues and the control unit controls the image formation apparatus not to accept data from any external apparatus other than the one or more external apparatuses specified by the second transmission source information, and subsequently, after the communication with the external apparatus has ended, the control unit controls the image formation apparatus not to accept data reception from any external apparatus other than the one or more external apparatuses specified by the transmission information associated with the user.

4. An image formation apparatus that receives data transmitted from one or more external apparatuses connected through a network and processes the data received, the apparatus comprising:

a memory unit storing transmission source information specifying the external apparatuses associated with user information specifying one or more users of the image formation apparatus, wherein each user specified by user information is associated with at least one of the external apparatuses specified by transmission source information;

a user information receiving unit adapted to receive user information input by a user of the image formation apparatus;

an authentication unit adapted to authenticate the user of the image formation apparatus based on the user information stored in the memory unit and the user information received by the user information receiving unit; and a control unit adapted to control the image formation apparatus, in response to the authentication unit authenticating the user, not to accept data from the at least one of the external apparatuses specified by the transmission source information that is associated with the user specified by the user information of the authenticated user.

5. A data reception processing method performed by an image formation apparatus for receiving data transmitted from one or more external apparatuses connected through a network and for processing the data received, the method comprising:

a storing step of storing, in a memory unit, transmission source information specifying the external apparatuses associated with user information specifying one or more users of the image formation apparatus, wherein each user specified by user information is associated with at least one of the external apparatuses specified by transmission source information;

a user information receiving step of receiving user information input by a user of the image formation apparatus;

an authentication step of authenticating the user of the image formation apparatus based on the user information received in the user information receiving step; and a controlling step of controlling the information processing apparatus, in response to the user being authenticated in the authentication step, not to accept data from an external apparatus other than the at least one of the external apparatuses specified by the transmission source information that is associated with the user specified by the user information of the authenticated user.

6. A data reception processing method performed by an image formation apparatus for receiving data transmitted from one or more external apparatuses connected through a network and for processing the received data, the data reception processing method comprising:

a storing step of storing, in a memory unit, transmission source information specifying the external apparatuses associated with user information specifying one or more users of the image formation, wherein each user specified by user information is associated with at least one of the external apparatuses specified by transmission source information;

a user information receiving step of receiving user information input by a user of the image formation apparatus;

an authentication step of authenticating the user of the image formation apparatus based on the user information stored in the storing step and the user information received in the user information receiving step; and a controlling step of controlling the image formation apparatus, in response to the user being authenticated in the authentication step, not to accept data from the at least one of the external apparatuses specified by the transmission source information that is associated with the user specified by the user information of the authenticated user.

7. A computer-readable storage medium that stores a program for causing an image formation apparatus to execute a data reception processing method of receiving data transmitted from one or more external apparatuses connected through a network and of processing the data received, the method comprising:

a storing step of storing, in a memory unit, transmission source information specifying the external apparatuses associated with user information specifying one or more users of the image formation apparatus, wherein each user specified by user information is associated with at least one of the external apparatuses specified by transmission source information;

a user information receiving step of receiving user information input by a user of the image formation apparatus;

an authentication step of authenticating the user of the image formation apparatus based on the user information received in the user information receiving step; and a controlling step of controlling the image formation apparatus, in response to the user being authenticated in the authentication step, not to accept data from an external apparatus other than the at least one of the external apparatuses specified by the transmission source information that is associated with the user specified by the user information of the authenticated user.

8. A computer-readable storage medium that stores a program for causing an image formation apparatus to execute a data reception processing method of receiving data transmitted from one or more external apparatuses connected through a network and of processing the data received, the method comprising:

a storing step of storing, in a memory unit, transmission source information specifying the external apparatuses associated with user information specifying one or more users of the image formation apparatus, wherein each user specified by user information is associated with at least one of the external apparatuses specified by transmission source information;

a user information receiving step of receiving user information input by a user of the image formation apparatus;

an authentication step of authenticating the user of the image formation apparatus based on the user information input stored in the storing step and the user information received in the user information receiving step; and a controlling step of controlling the image formation apparatus, in response to the user being authenticated in the authentication step, not to accept data from the at least one of the external apparatuses specified by the transmission source information that is associated with the user specified by the user information of the authenticated user.

9. An image formation apparatus that receives data transmitted from one or more external apparatuses connected through a network and processes the data received, the apparatus comprising:

a memory unit storing transmission source information specifying the external apparatuses associated with user information specifying one or more users of the image formation apparatus, wherein each user specified by user information is associated with at least one of the external apparatuses specified by transmission source information;

a user information receiving unit adapted to receive user information input by a user of the image formation apparatus; and a control unit adapted to control the image formation apparatus, in a case where the user is authenticated based on the user information received by the user information receiving unit, not to accept data from an external apparatus other than the at least one of the external apparatuses specified by the transmission source information that is associated with the user specified by the user information of the authenticated user.

10. An image formation apparatus that receives data transmitted from one or more external apparatuses connected through a network and processes the data received, the apparatus comprising:

a memory unit storing transmission source information specifying the external apparatuses associated with user information specifying one or more users of the image formation apparatus, wherein each user specified by user information is associated with at least one of the external apparatuses specified by transmission source information;

a user information receiving unit adapted to receive user information input by a user of the image formation apparatus; and a control unit adapted to control the image formation apparatus, in a case where the user is authenticated based on the user information received by the user information receiving unit, not to accept data from the at least one of the external apparatuses specified by the transmission source information that is associated with the user specified by the user information of the authenticated user.

* * * * *